United States Patent
De Remer

[15] 3,684,861
[45] Aug. 15, 1972

[54] ELECTRIC TOASTER CONTROL
[72] Inventor: Harold A. De Remer, Allentown, Pa.
[73] Assignee: General Electric Company
[22] Filed: July 22, 1971
[21] Appl. No.: 165,204

[52] U.S. Cl. .................219/413, 99/329, 99/393, 99/443 R, 219/398, 219/405
[51] Int. Cl. ........................................F27d 11/02
[58] Field of Search......219/395, 398, 405, 412, 413, 219/521; 99/329, 359, 389, 393, 443 R; 236/68

[56] References Cited

UNITED STATES PATENTS

| | | | |
|---|---|---|---|
| R23,600 | 12/1952 | Gardner | 99/329 |
| 2,643,061 | 6/1953 | Johnson | 236/68 |
| 2,748,244 | 5/1956 | Nellis | 219/398 |
| 3,119,000 | 1/1964 | Loch et al. | 219/413 |
| 3,119,001 | 1/1964 | Andrews | 219/413 |
| 3,152,243 | 10/1964 | Andrews | 219/405 |
| 3,412,236 | 11/1968 | Hild et al. | 219/413 |
| 3,529,534 | 9/1970 | Snyder | 99/329 |
| 3,560,711 | 2/1971 | Manecke | 219/413 |
| 3,585,360 | 6/1971 | Young et al. | 219/405 |

Primary Examiner—Volodymyr Y. Mayewsky
Attorney—Lawrence R. Kempton et al.

[57] ABSTRACT

An electric oven toaster with a thermostat for controlling energization of the heating elements when the oven toaster is being operated as an oven, and a timer for controlling energization of the heating elements when the oven toaster is being operated as a toaster. A push button is moved upwardly from an OFF position for increasing the temperature setting when the oven toaster is being operated as an oven and the same push button is moved downwardly from the OFF position for setting the oven toaster for toaster operation.

31 Claims, 15 Drawing Figures

PATENTED AUG 15 1972　　3,684,861

Inventor:
Harold A. De Remer
by
*[signature]*
Attorney

PATENTED AUG 15 1972

3,684,861

Inventor:
Harold A. De Remer
by
Attorney

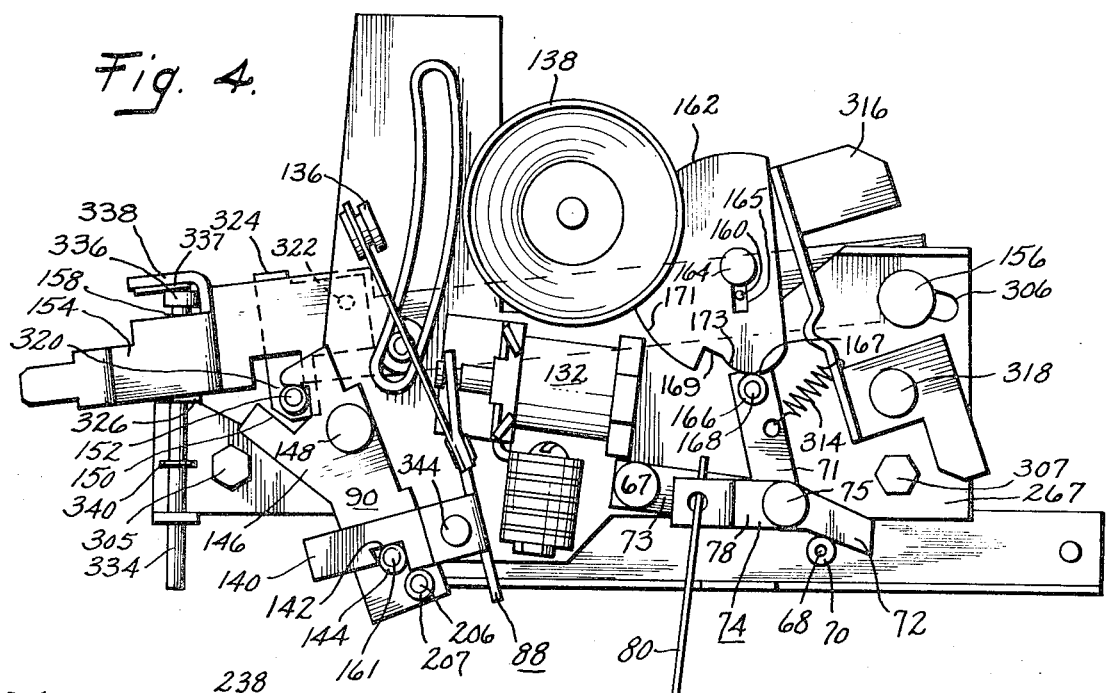
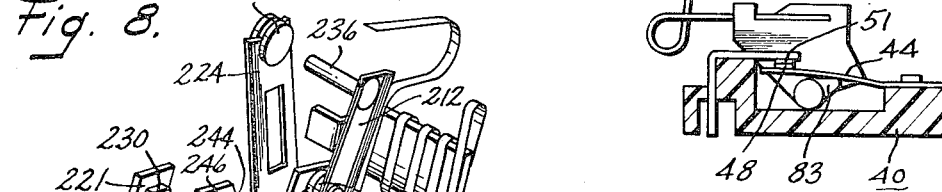
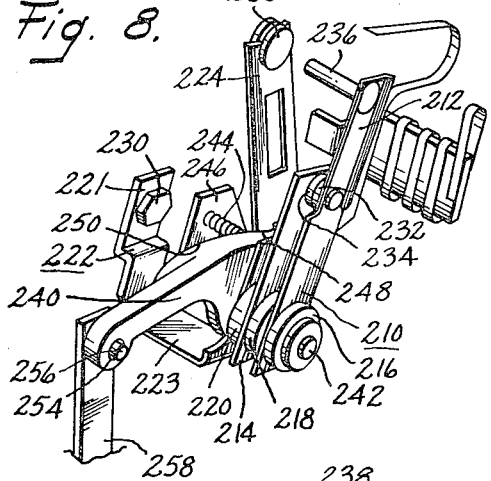
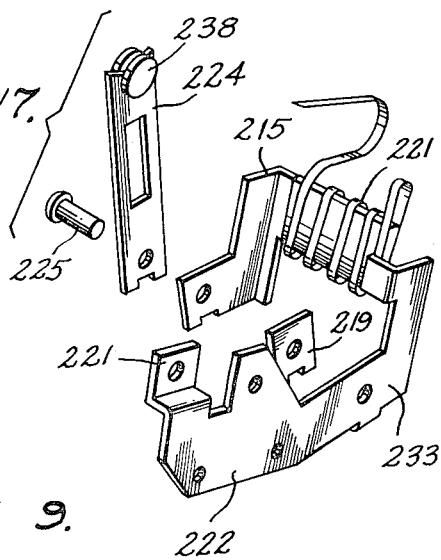

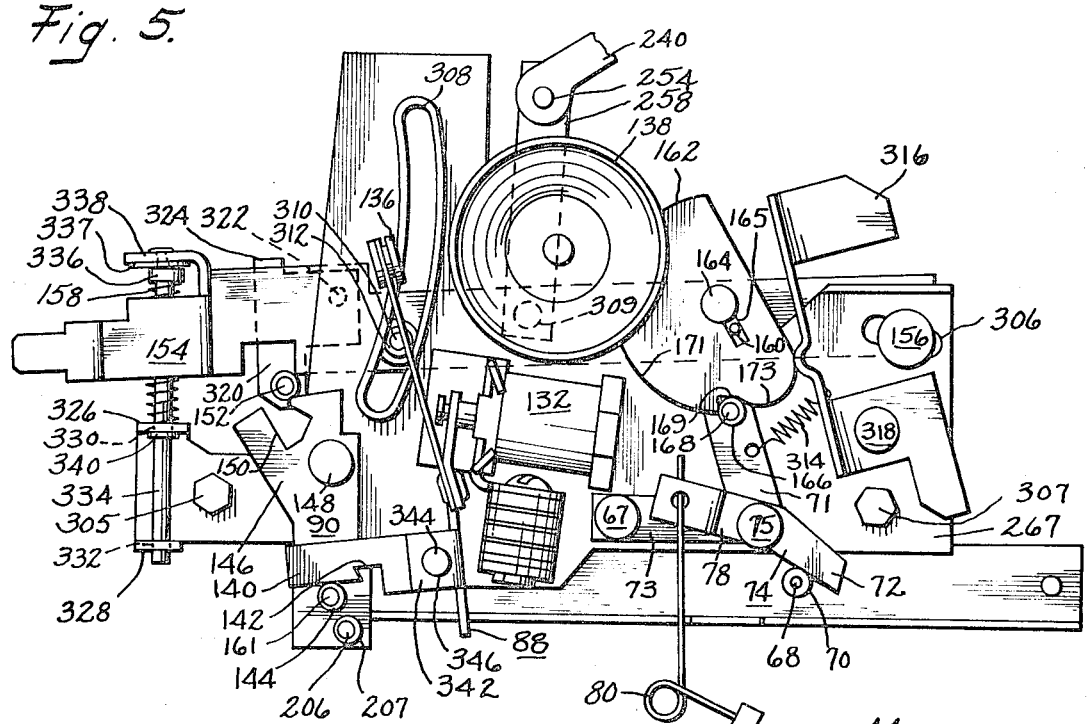
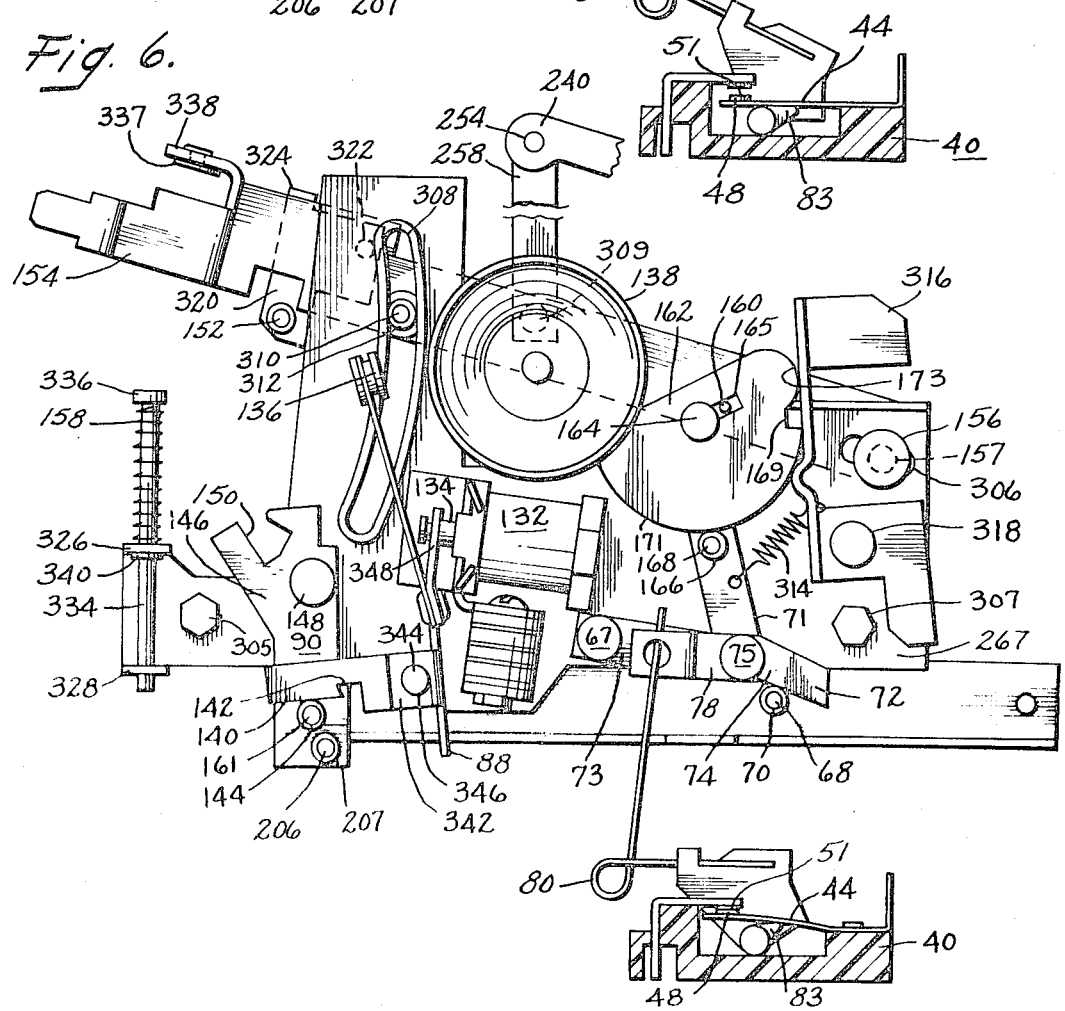

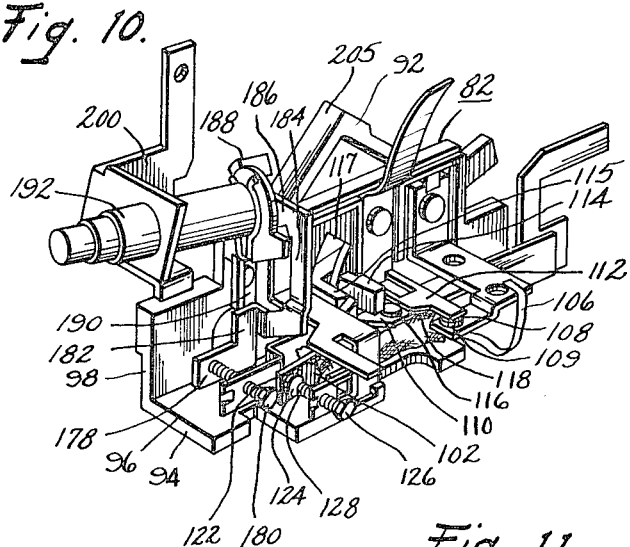
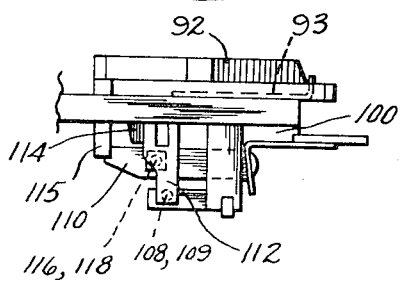
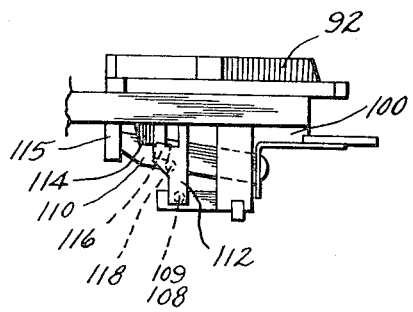
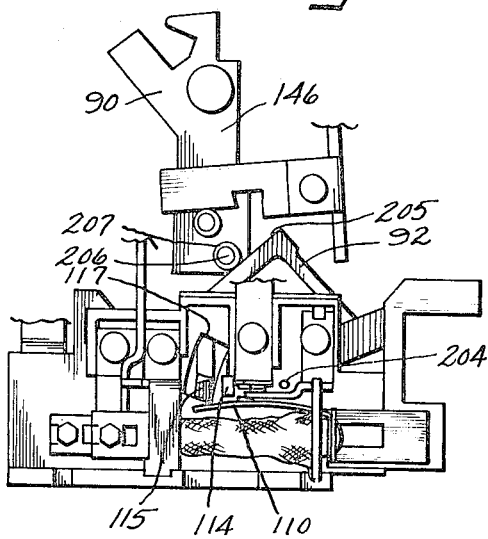
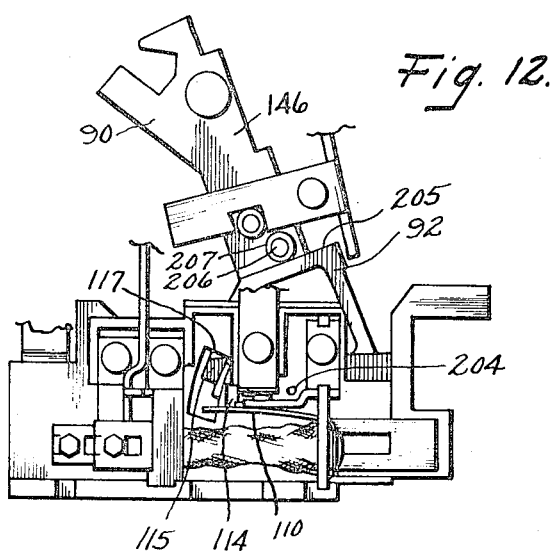
Inventor:
Harold A. De Remer Inventor:
Harold A. De Remer

ELECTRIC TOASTER CONTROL

BACKGROUND OF THE INVENTION

The present invention relates to an electric oven toaster, and more particularly to a mechanism for selectively controlling operation of the oven toaster as either an oven or a toaster.

As is well known in the electric toaster art, electric oven toasters have used thermostats and other control devices for controlling operation of a toaster as an oven and also for controlling operation of the toaster as a toaster. For example, in U.S. Pat. No. 3,119,000 to J. P. Lock et al, assigned to the same assignee as the present invention, there is disclosed an arrangement for controlling operation of an oven toaster as either an oven or a toaster. The controls are arranged along the lower front of the oven toaster and a door is positioned above the controls for permitting access to the interior of the oven toaster. A heat responsive member 98 is positioned within the toaster for sensing the surface temperature of the bread to control the oven toaster when it is used as a toaster. During baking operations, the same heat responsive member 98 is used to control the energization of the heating elements 16, 17, 18 and 19 so as to regulate the air temperature in the cooking chamber. The controls include a knob 117 which is movable along the lower front portion of the toaster for setting cam actuators which are positioned behind the knob in order to select and set the desired operation of the oven toaster as a toaster or an oven. This invention is concerned with such an oven toaster, and more particularly, to an improved control mechanism which may be mounted at the side of an oven toaster and yet operated from the front of the oven toaster in order to permit the major portion of the front of the oven toaster to be utilized as an access opening to the interior of the oven toaster.

Accordingly, it is a particular object of my invention to provide an improved control mechanism for an oven toaster.

It is another object of this invention to provide a control mechanism which may be readily and conveniently mounted at the side of an oven toaster and which may be set at the front of the oven toaster to toast bread or bake convenience foods.

It is also an object of this invention to provide an improved low cost control mechanism for an electric oven toaster having relatively few parts which may be easily manufactured and assembled to each other.

SUMMARY OF THE INVENTION

In accordance with one of the aspects of this invention, an electric oven toaster includes a thermostat for controlling energization of electric heating elements when the oven toaster is being used as an oven and a separate timer for controlling the heating elements when the toaster is being used as a toaster. A primary manual setting mechanism is provided for controlling the operation of both the oven thermostat and the toaster timer. The manual setting mechanism has an off position for retaining both the oven thermostat and the toaster timer in their off positions and the mechanism is constructed and arranged so that it can be moved in one direction from its off position for varying the temperature setting of the oven thermostat to thereby allow the oven thermostat to control energization of the heating elements for operating the oven. While the primary setting mechanism is in any one of its plurality of oven temperature setting positions, it prevents the toaster timer from controlling energization of the heating elements. The primary manual setting mechanism is also movable in another direction from the off position to a TOAST position for permitting operation of the oven toaster as a toaster. When it has been moved to such a TOAST position it prevents the oven thermostat from controlling the heating elements and the heating elements are under control of the toaster timer. Thus, at the end of the timing interval of the toaster timer, the toaster timer de-energizes the heating elements.

With this construction, the thermostat for controlling operation of the oven toaster as an oven is essentially separate from the timer which is utilized for controlling operation of the oven toaster as a toaster. Thus, there is no reason to sense the temperature of the oven in close proximity to a slice of bread and the thermostat may be positioned anywhere on the oven toaster for sensing the temperature within the oven. In accordance with my invention, it is positioned at the side of the oven toaster some distance above the carriage which holds the food or toast.

In addition, with such a construction a separate toast timer control knob may be adjusted to set an appropriate time interval for toasting bread to a desired degree of brownness, and the primary manual setting mechanism may be moved to any of its positions without disturbing the preset position of the toaster timer control knob. Accordingly, after the oven toaster has been used as an oven and the user wishes to toast a slice of bread to a desired degree of brownness, it is merely necessary for him to move the primary manual setting member from its OFF position to its TOAST position. The bread will be toasted to the individual "Light-Dark" preference setting which has been previously set by movement of the toast timer control knob.

Moreover, this invention permits the use of subassemblies which may also be used in other toaster and oven appliances. For example, the principal components of the toast timer which are used in this invention may also be used in a pop-up type toaster.

In addition, relatively great flexibility is obtained with respect to the location of the components, and in accordance with the preferred embodiment of the invention the thermostat, toaster timer, and the primary manual setting mechanism may all be located at one side of the toaster in a relatively small space, and yet the primary manual setting member may be operated from the front of the oven toaster so that the major portion of the front of the oven toaster may be utilized as an access opening to the interior of the oven toaster.

This is accomplished by the use of relatively few parts which are readily combined with each other. Thus, an exceedingly simple, readily manufactured oven toaster control has been achieved.

BRIEF DESCRIPTION OF THE DRAWING

Other objects and attendant advantages of the invention will be apparent from the following description taken in connection with the accompanying drawing in which:

FIG. 4 is a fragmentary side elevational view of a portion of the electric oven toaster control mechanism shown in FIG. 3 illustrating the positions of the parts at the commencement of a toasting cycle;

FIG. 5 is a fragmentary side elevational view similar to FIG. 4 showing the OFF position of the parts at the termination of a toasting cycle;

FIG. 6 is a fragmentary side elevational view similar to FIG. 4 showing the positions of the parts when the oven toaster is being used as an oven;

FIG. 8 is a perspective view of the oven thermostat similar to FIG. 7 showing the thermostat in its OVEN position for regulating the temperature in the oven toaster shown in FIG. 1;

FIG. 9 is a perspective view of the oven thermostat similar to FIG. 7 showing the oven thermostat in its inoperative or TOAST position when the oven toaster is being controlled by its toaster bimetal timer;

FIG. 10 is a perspective view of the bimetal toaster timer illustrated in FIG. 3;

FIG. 11 is a side elevational view of the toaster bimetal timer illustrated in FIG. 10 showing the positions of the parts when the oven toaster is being operated as an oven and the heat-up cool-down bimetal timer is prevented from moving into its cool-down cycle;

FIG. 12 is a side elevational view of the toaster heat-up cool-down bimetal timer similar to FIG. 11 showing the positions of the parts at the commencement of a toasting cycle, i.e., bimetal heater switch closed and timer actuator removed from a switch blade to permit the timer to move into its cool-down cycle;

FIG. 13 is a fragmentary top plan view of the heat-up cool-down bimetal timer shown in FIG. 12 showing the positions of the parts in the bimetal cool-down cycle, i.e., bimetal heater switch open;

FIG. 14 is a top plan view of the heat-up cool-down bimetal timer similar to FIG. 13 showing the positions of the parts at the commencement of a toasting cycle, i.e., bimetal heater switch closed as also shown in FIG. 12;

FIG. 17 is a fragmentary exploded perspective view of a portion of the oven thermostat shown in FIG. 7 illustrating details of a heat pipe arrangement.

DESCRIPTION OF THE PREFERRED EMBODIMENT

Figure 1:
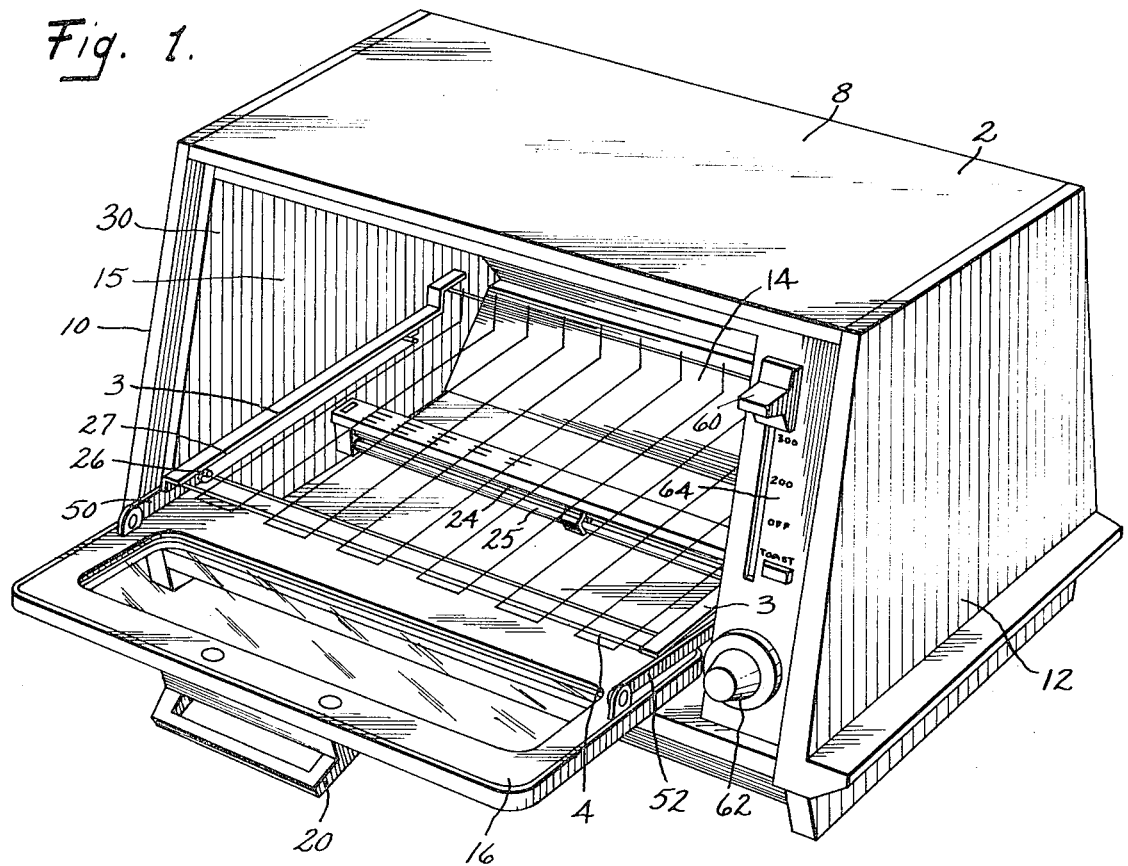
FIG. 1 is a perspective view of an electric oven toaster embodying my improved electric toaster control mechanism.
Figure 2:
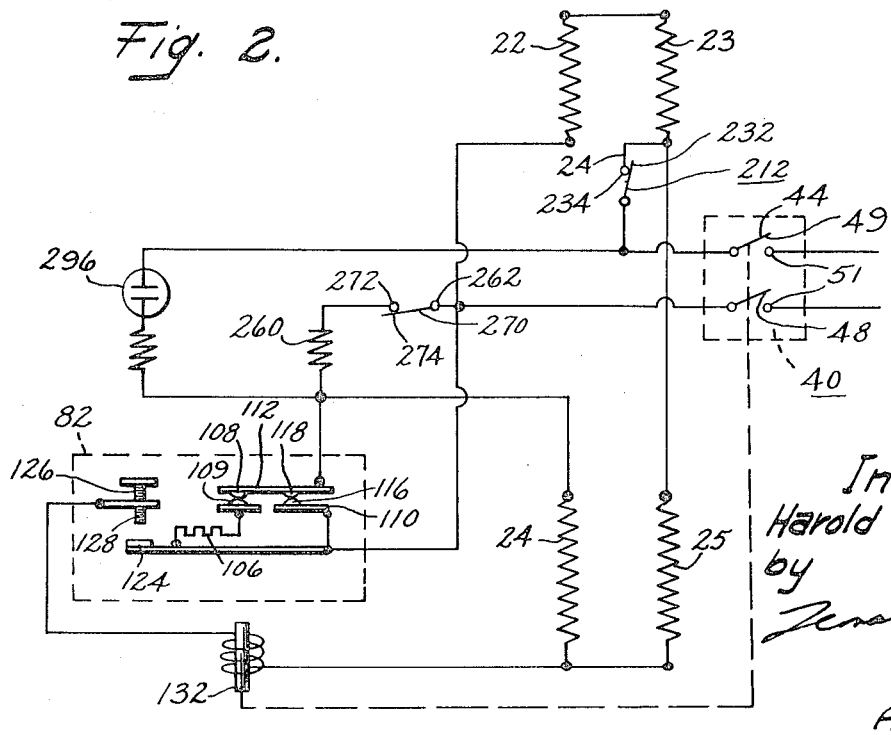
FIG. 2 is a circuit diagram and partial schematic view of portions of the control mechanism for the electric toaster illustrated in FIG. 1.

Referring now to the drawing and first particularly to FIGS. 1 and 2, there is shown an electric oven toaster 2 in which is mounted a generally horizontal carriage 3 for supporting a food rack 4 for holding food to be cooked or bread to be toasted. The oven toaster includes a generally horizontal top wall 8, generally parallel vertical side walls 10 and 12 and a front opening 14 to provide access to the inside of the oven toaster.

Sheet metal side plates 30 and 32 are positioned inside of the outer side walls 10 and 12 to define a cooking and toasting chamber 15. The oven toaster also includes upper sheathed electric elements 22 and 23 and lower heating elements 24 and 25 for toasting bread and heating the cooking chamber 15.

A front door 16 is provided for closing the front opening 14. The door 16 is pivotally mounted to the lower portion of the oven toaster and as shown in FIG. 1 it is in its generally horizontal full open position.

Figure 16:
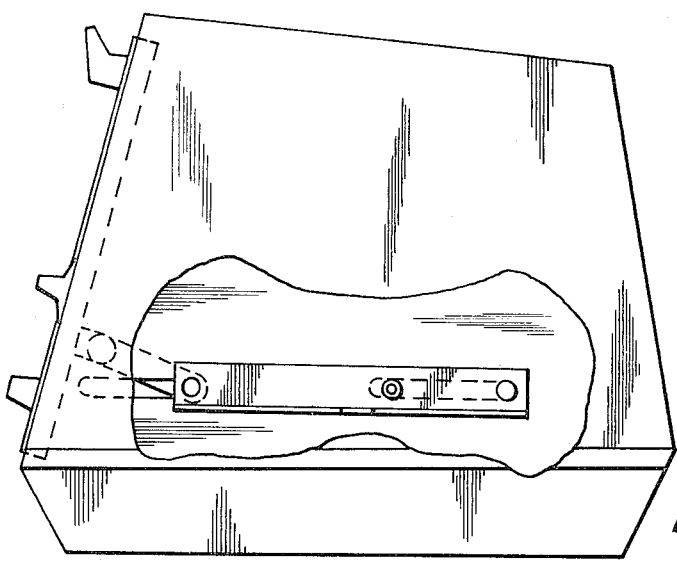
FIG. 16 is a side elevational view of the oven toaster shown in FIG. 1 with portions of the right outside wall broken-away to show details of construction.

The food rack 4 is arranged to be moved partially through the front opening 14 of the oven toaster when the door is moved to its full open position as shown in FIG. 1. To achieve this in a conventional manner, the carriage 3 for supporting the food rack 4 includes two carriage links 26 and 28 which are mounted for slidable movement in a forward or rearward direction in the oven toaster. As shown in FIG. 16, a pair of slots 27 and 29 are formed in each of the sheet metal side plates 30 and 32 of the oven toaster and outwardly projecting support pins 34 are inserted through the slots 27 and 29 and are riveted or otherwise secured to the carriage links 26 and 28 in order to slidably support the carriage links 26 and 28 on the side plates 30 and 32 of the oven toaster. The details of the door operating mechanism and the arrangement for supporting the carriage links 26 and 28 on the sheet metal side plates 30 and 32 of the oven toaster do not form a part of this invention and are described and illustrated in greater detail in a co-pending application of Paul V. Snyder (6D– 4181), Ser. No. 90,903, assigned to the same assignee as the present invention.

As described in more detail in the aforementioned application, the front door 16 of the oven toaster is linked to the carriage 3 so that movement of the carriage 3 in a forward direction will result in opening the front door, and correspondingly pivotal movement of the front door in a door opening direction will result in forward movement of the carriage 3 including the food rack 4 through the front opening 14 of the oven toaster. To achieve this, two door links 50 and 52 are conveniently pivoted to the front door and to forward pins 34 on the carriage links 26 and 28. Thus, it can be appreciated that when the door is manually opened by pulling on its front handle 20 the door will swing downwardly about its pivots and during this movement the door links 50 and 52 will pull outwardly on the pins 34 to slide the carriage 3 including links 26 and 28 and the food rack 4 out of the front opening 14 of the toaster. It can also be appreciated that when the door is manually closed the carriage links 26 and 28 are moved from their forward position illustrated in FIG. 1 to their generally rearward position illustrated in FIG. 3. Thus, when the door 16 is opened the carriage links 26 and 28 and the carriage 3 are moved forwardly and when the door is closed the carriage links 26 and 28 are moved rearwardly.

The controls for the oven toaster are uniquely mounted at the side of the oven toaster, and yet, a primary manual setting member 60 and a toast brownness control knob 62 extend through a front plate 64 of the toaster so that they may be readily operated from the front of the oven toaster. As shown more particularly in FIG. 3, the overall dimensions of my unique control mechanism are relatively small, and since the mechanism is positioned at the side of the oven toaster the major portion of the front of the oven toaster may be utilized to provide the access opening 14 to the interior of the oven toaster.

Figure 3:
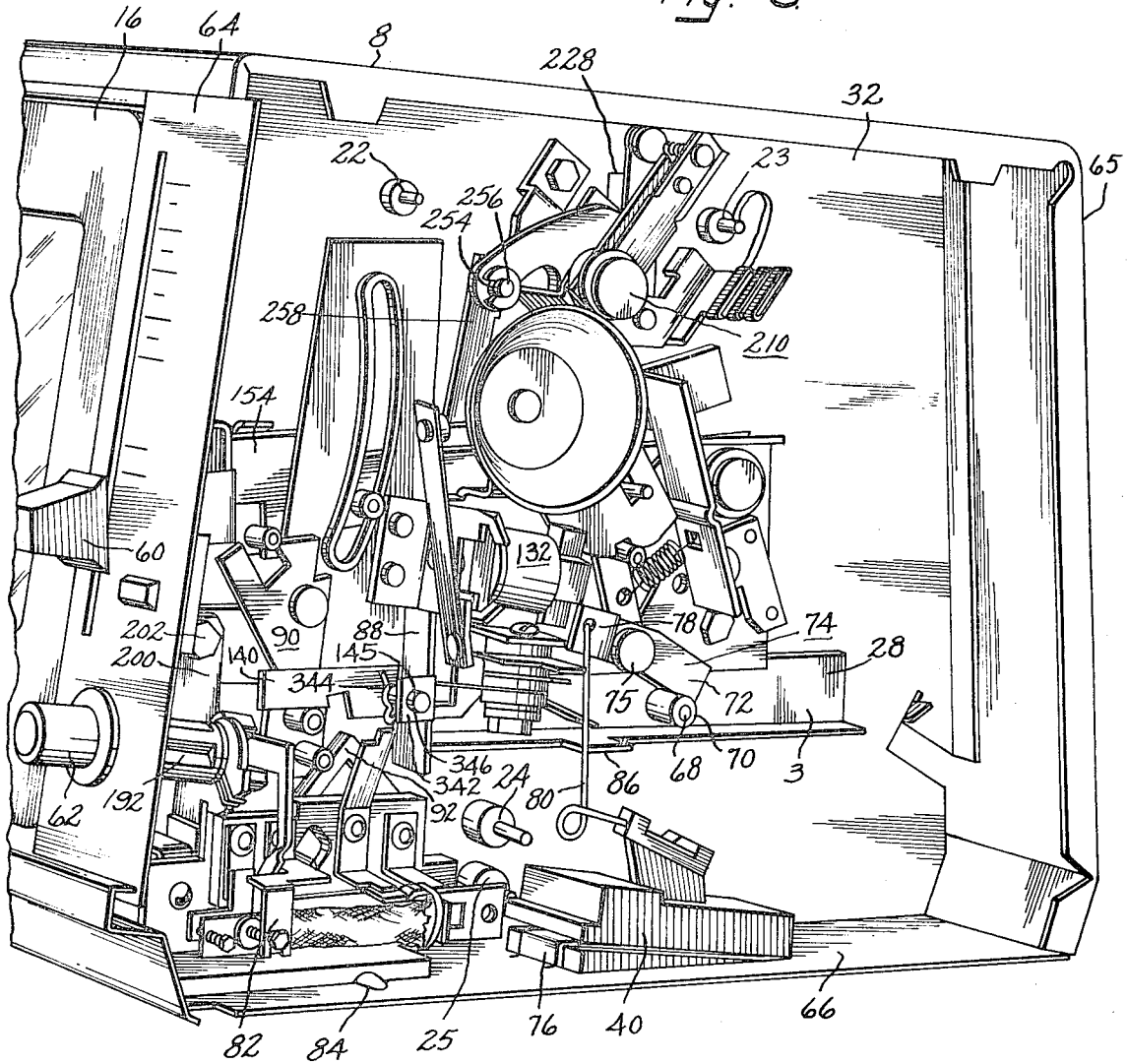
FIG. 3 is a right side perspective view of the oven toaster shown in FIG. 1 with a right outside wall of the oven toaster removed in order to show details of my improved control mechanism.

A control chamber housing is uniquely achieved by simply forming a lower flange 66 on the sheet metal side plate 32 to form a generally horizontal bottom wall of the control chamber housing. The top, rear, and front walls of the control chamber housing are readily achieved by extending the top wall 8, the front wall 64 and the rear wall 65 of the oven toaster a short distance to the right of the sheet metal side plate 32. As shown in FIG. 1, a side wall 12 formed of plactic or other suitable material may be connected to end portions of the sheet metal top, bottom, front and rear walls of the control chamber for readily closing the control chamber. With particular reference to FIG. 3, it can be appreciated that removal of the outside wall 12 of the control chamber provides ready access to all of the components which are mounted within the control chamber.

The components of my control mechanism are uniquely supported by the sheet metal side plate 32 and are positioned about the forwardly and rearwardly movable carriage link 28 which is moved forwardly when the door 16 is opened and rearwardly when the door is closed. Thus, the carriage link 28 may be utilized to prevent energization of the heating elements 22, 23, 24 and 25 when the door is in its opened position illustrated in FIG. 1. To achieve this, an outwardly extending lug 68 may be riveted to the forwardly and rearwardly movable carriage link 28, and a sleeve bearing 70 may be positioned over the lug 68 for moving a right arm 72 of a main switch actuating lever 74 to open the main switch when the door 16 is opened.

MAIN SWITCH

With particular reference to FIG. 3, a main switch 40 of the oven toaster may be readily mounted on the generally horizontal bottom wall 66 of the sheet metal side plate 32 by tabs 76 which may be struck from the bottom wall 66 of the plate 32. The switch is shown in cross-section in FIGS. 4, 5 and 6 and diagrammatically in FIG. 2. With this construction, it can be appreciated that downward movement of the left arm portion 78 of the switch actuating lever 74 will move a spring wire switch actuating lever 80 downwardly to cause a cam member 83 to be rotated to lift switch blades 44 until contacts 48 abut contacts 51 to thereby close the main switch 40. The details of the main switch 40 do not form a part of my invention and are described and illustrated in greater detail in U.S. Pat. No. 3,529,534 by P. V. Snyder, assigned to the same assignee as the present invention.

HEAT-UP COOL-DOWN TIMER

My unique control mechanism also includes a heat-up cool-down bimetal timer 82 for timing the toaster heating cycle. As shown in FIG. 3, the timer 82 is conveniently mounted on the lower generally horizontal wall 66 of the sheet metal side plate 32 by tabs 84 which may be readily struck upwardly from the relatively thin sheet metal side plate. As shown, the heat-up cool-down bimetal timer 82 is also uniquely positioned below the forwardly and rearwardly movable carriage 28 so that the carriage 28 may prevent operation of the timer 82 when the door is moved to its opened position illustrated in FIG. 1. To achieve this, a tab 86 is integrally formed with the carriage 28 and extends outwardly from the carriage for cooperation with a solenoid latch lever 88 (to be more fully described hereinafter) which in turn cooperates with a pivoted latch lever 90 of my unique primary manual setting mechanism (also to be more fully described hereinafter) which in turn cooperates with an actuator 92 of the heat-up cool-down bimetal timer to hold the timer 82 in its off position when the door 16 is open.

The heat-up cool-down bimetal timer 82 illustrated in FIG. 2 and the other figures of this application does not form a part of my invention and is claimed and described in greater detail in a co-pending application of Paul V. Snyder, Ser. No. 165,203 filed July 22, 1971, and a Snyder Pat. No. 3,529,534, both assigned to the same assignee as the instant invention.

When the main oven toaster heater switches 48 and 49 have been placed in their closed position by my unique primary manual setting mechanism to start toasting a slice of bread, the heat-up cool-down bimetal timer 82 is also energized to control the duration of the toasting time interval. As shown in FIGS. 10, 11, 12, 13 and 14, the bimetal timer supporting structure includes a generally L-shaped piece of phenolic 94 or other suitable insulating material. The phenolic support consists of a generally flat bottom wall portion 96 and a generally vertical wall portion 98. The vertical wall portion 98 includes an outwardly extending projection 100 for mounting a bimetal 102. A sheet of insulating material 104 is wrapped around the bimetal 102 and a heater wire 106 is wrapped around the insulating material in order to heat the bimetal 102. A switch 108 and 109 controls energization of the bimetal heater, and it is in a closed position when a switch blade 110 is held away from a switch blade 112 by a lug 114 which may be integrally formed with the upper vertical wall 98 of the bimetal phenolic support.

As the bimetal 102 is heated by the bimetal heater 106 the bimetal itself bows away from the vertical wall 98 of the phenolic insulting plate, i.e., the central portion of the bimetal tends to move outwardly and the end portions of the bimetal are forced inwardly; and as described in greater detail in the aforementioned co-pending application of Paul V. Snyder, after the bimetal has been heated to a predetermined amount, blade 110, it is moved away from the vertical wall 98 of the phenolic support until it is unrestricted by the projection 114. At that instant, the leaf spring switch blade 110 moves upwardly under its spring force to move contact 116 on the switch blade 110 into contact with a contact 118 on switch blade 112 to lift switch blade 112 to thereby open switch contacts 108 and 109 to de-energize heater 106 to permit the bimetal 102 to cool down. As the bimetal cools down it tends to straighten out and the end portions which had been urged toward the vertical wall 98 now move away from the vertical wall, particularly the free end portion 120 and a switch blade 122 which is attached thereto moves away from the vertical wall member 98. Upon continued movement in this direction, a switch contact 124 will abut an end 128 of screw 126 to close a solenoid switch 124 and 128. In a manner to be more fully described hereinafter, when the solenoid switch 124 and 128 is closed, a solenoid 132 is energized to move a metal leg 134 of the solenoid to the right as shown in FIG. 6 to cause hammer 136 to ring bell 138 to thereby indicate that the toasting cycle has been terminated. At the same instant, a horizontal arm 140 of lever 88 is lifted to release latch notch 142 from pin 144 to allow the upper portion 146 of lever 90 to be pivoted to the right about pivot 148 to release latch notch 150 from pin 152 of lever 320 to allow lever 154 to be moved upwardly about pivot slot 306 by spring 158, to thereby allow pin 160 on lever 154 to rotate cam 162 about its axis 164 to move the off notch 169 of cam 162 to position pin 168 of lever 71 and 73 in the off cam notch 169. This allows the main switch actuating lever 72-78 to rotate clockwise about its pivot 75 to lift the left arm 78 of the lever to open the main switch as shown in FIG. 5. Lever 154, spring 158, lever 90, cam 162 and other related parts constitute a portion of my unique primary manual setting mechanism and will be more fully described hereinafter.

A toast brownness timer control and cam construction is provided for setting the toasting time interval of the heat-up cool-down bimetal timer 82. This construction includes a timer cam follower plate 178 and an adjusting screw 180. These parts determine the pivot point of the left end of bimetal 102 and thereby cooperate to set the time when the switch 108 and 109 de-energizes the bimetal heater 106 to thereby determine the time interval of the heat-up cool-down bimetal 102 and the toasting cycle. A manufacturing adjustment in the length of this cycle is initially made by adjusting the position of screw 180 with respect to the follow-up plate 178. It can be seen that the screw 180 is rotated within the threaded portion of blade 123 to initially adjust the relative position of the end of the screw 180 to the surface of the cam follower plate 178.

As shown more particularly in FIG. 10, the timer cam follower plate 178 includes a portion 182 which extends downwardly from the top portion of the vertical wall 98 to a position below the bimetal blade 102, an upwardly extending portion 184, a rearwardly extending portion 186 and a cam contacting portion 188. The top of the generally vertical portion 182 is fixed to a leaf spring 190 which is riveted or otherwise secured to the vertical wall 98 of the phenolic support. With this construction the cam follower plate 178, and more particularly, the generally vertical cam contacting portion 188 is spring-urged outwardly into engagement with a surface of a rotatable cam member 192.

As shown more particularly in FIG. 3, a suitable manual control knob 62 is attached to the rotatable cam member 192 to enable an operator to rotate the timer control knob and the cam 192 to control the position of the cam follower vertical wall 178 to thereby control the length of the toasting cycle. Counterclockwise rotation of the cam 192 manually moves the cam contacting portion 188 of the timer setting member toward the oven toaster to move the vertical arm 178 of the cam follower plate toward the adjusting screw 126, thereby decreasing the toasting time interval. Movement of the cam 192 in the opposite direction allows the cam follower plate 178 to move toward the vertical wall 98 and away from adjusting screw 126 thereby increasing the toasting time interval. Thus, it can be appreciated that when the manually rotatable control knob 62 is moved in a clockwise direction the length of the toasting time interval is increased, and when the timer control knob is rotated in a counterclockwise direction the length of the toasting time cycle is decreased. As shown more particularly in FIG. 10, the rotatable cam member 192 is supported for rotation by a bracket 200 which may be secured to a support plate 267 and bracket 300 by a screw 202 or other suitable fastening means.

The heat-up cool-down bimetal timer actuator member 92 is provided for permitting or preventing operation of the heat-up cool-down bimetal timer by controlling movement of switch blade 110. The timer 82 is prevented from operating by holding the switch blade 110 down, as shown in FIG. 11, which prevents movement of the switch blade 110 up to a bimetal cool-down position wherein it would lift switch blade 112 to open the switch contacts 108. As shown more particularly in FIGS. 10, 11, 12, 13 and 14, the actuator 92 is preferably formed of a phenolic plastic, and it is pivoted about a shaft 204 which may be connected to the generally vertical wall 98. The actuator includes an inwardly extending lug 115 which is positioned above switch blade 110 so that it may be moved downwardly against the force of the switch blade 110 to open contacts 116 and 118 and to retain contacts 108 and 109 in their closed position. This is the normal position of the lug 115 and it is achieved by a spring 93 which constantly urges the actuator 92 and its lug 115 downwardly within the slot 117 which is formed in the upwardly extending wall 98 of the phenolic member.

The timer actuator 92 also includes an upwardly extending wall 205 which is arranged in the path of a lug 206-207 which is formed on lever 90 of my unique primary manual setting mechanism. It can be appreciated that movement of the lug 206 and 207 rearwardly from the position illustrated in FIG. 11 to the position illustrated in FIG. 12 will move the phenolic actuator 92 clockwise about its pivot 204 to thereby lift lug 115 to permit a full cycle of operation of the heat-up cool-down bimetal timer 82. Thus, after the bimetal 102 has been heated sufficiently, the switch blade 110 may be moved out from under the fixed lug member 114 to permit upward movement of switch blade 110 to close switch contacts 116 and 118 and open contacts 108 and 109 to thereby interrupt the flow of current to the bimetal heater wire 106 to allow the bimetal to operate in its cool-down cycle.

OVEN THERMOSTAT

According to my invention, a thermostat 210 is mounted on side plate 32 of the oven toaster for controlling energization of the heating elements 22, 23, 24 and 25 when the oven toaster is being operated as an oven. Since a separate heat-up cool-down bimetal timer 82 is utilized for controlling operation of the oven toaster when it is operated as a toaster, there is no reason to sense the temperature of the oven in close proximity to the toast or other food, and thus, the oven toaster thermostat 210 may be positioned anywhere on the oven toaster for sensing the temperature within the oven.

In the embodiment illustrated, the thermostat 210 is positioned at the upper portion of the sheet metal side plate 32 above the carriage link 28 and my unique primary manual setting mechanism 60 and 154 so that it may be readily controlled by the primary manual setting mechanism and the toaster carriage link 28 as it is moved forwardly and rearwardly as the door is opened and closed.

Thermostat 210 includes a stack of insulating disks 216, 218 and 220 for spacing tow switch blades 212 and 214 and a mounting bracket 222. The mounting bracket 222 is generally U-shaped and includes a relatively rigid portion 221 which may be connected to the side plate 32 of the oven toaster by a screw 230 or other suitable securing means. As shown in FIG. 9, a bimetal blade 224 is connected to an arm 226 of the mounting bracket by a rivet, and as shown in FIG. 3, it is positioned adjacent to an aperture 228 which may be formed in the upper portion of the sheet metal side plate 32 for sensing the temperature within the oven chamber 15. The switch blades 212 and 214 are normally spring biased toward each other to close contacts 232 and 234 which are connected to the end portions of the switch blades, respectively.

An elongated actuating pin 236 is fixed to switch blade 212, and a ceramic insulator 238 is fixed to the end of the thermostat bimetal 224 for permitting the bimetal to open the switch contacts 232 and 234 upon an increase in temperature. Since the bimetal 224 is mounted in good heat exchange relationship with the oven toaster through the aperture 228 which is formed in the sheet metal side plate 32, an increase in temperature within the oven will cause the bimetal 224 and the insulator 238 to move to the right as shown in FIG. 8 to abut pin 236 to move it and switch blade 212 to the right to open contacts 232 and 234.

Figure 7:
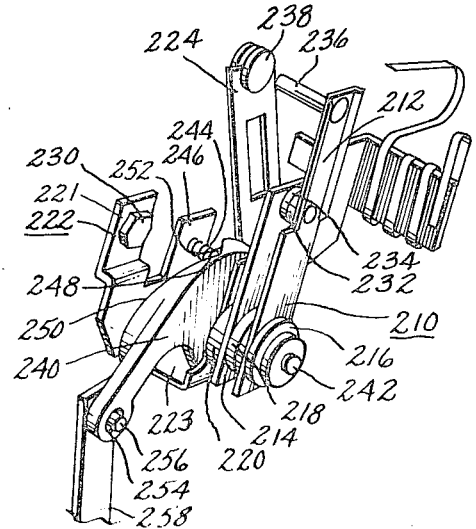
FIG. 7 is a perspective view of the oven thermostat of the control mechanism of the oven toaster shown in FIG. 3 illustrating the thermostat in its OFF position.

I provide a unique cam mechanism for manually adjusting the relative position of the switch blades 212 and 214 to the bimetal 224 for varying the temperature setting of the oven thermostat and for preventing operation of the oven thermostat 210 while the oven toaster is being operated by the toaster timer 82 as a toaster. As shown more particularly in FIG. 7, the cam mechanism includes a generally curved piece of phenolic material 240 which is rotatably mounted on a shaft 242 which extends through the fixed end portions of the switch blades 212 and 214, and the ceramic insulators 216, 218 and 220. The cam 240 changes the thermostat settings by physically moving the entire switch blade assembly 212 and 214 away from the bimetal blade 224. To achieve this, a screw 244 or other suitable projection may be connected to an arm 246 of the thermostat bracket 222 for cooperating with a cam surface which may be conveniently formed on the phenolic cam 240. As shown, the cam 240 includes a rather pronounced depression 248, a gently curved portion 250 which extends toward the sheet metal side plate 32 and to the left as shown in FIG. 7, and a steep cam surface 252 which extends upwardly from the depression 248. In addition, the bracket 222 includes a relatively thin flexible portion 223 which extends from the ceramic insulators 216, 218, 220 to a relatively rigid portion 221 which is connected to the side plate 32. With this construction, it can be appreciated that when the screw projection 244 is in the notch 248, the thermostat is in its lowest temperature setting since the actuating pin 236 is in its closest position to the insulator 238 of the bimetal. As the cam 240 is rotated clockwise from the position illustrated in FIG. 7, the generally smooth cam surface 250 of the cam 240 will slide on the end of the projection 244 to permit the entire switch blade assembly 212, 214 to pivot about the flexible portion 223 of the bracket to gradually move the entire switch blade assembly 212 and 214, and particularly the projection 236 further away from the ceramic insulator 238 of the bimetal to thereby increase the temperature setting the the thermostat. Thus, in order to open the switch contacts 232, 234 upon an increase in the temperature in the oven, the bimetal 224 and the insulated button which is positioned at the end of the bimetal will have to be moved a greater distance. Accordingly, the oven temperature setting is increased as the cam member 240 is rotated clockwise from the position illustrated in FIG. 7 to the position illustrated in FIG. 8.

The highest cam surface 252 of thermostat cam 240 is utilized for preventing operation of the thermostat 210 when the oven toaster is being operated as a toaster. It can be seen that when the cam 240 is rotated a relatively short distance counterclockwise from the position illus. In FIG. 7 to the position illus. in FIG. 9, the end of projection 244 will be placed at the highest point 252 on cam 240 to permit the entire switch blade assembly 212 and 214 to be moved a relatively great distance away from bimetal 224. The spacing is so great in this position that upon an increase in temperature within the cooking chamber 15 the insulator 238 of bimetal 224 cannot contact the projection 236 before the toaster timer 82 terminates the toasting cycle.

My unique primary manual setting mechanism includes a linkage for manually varying the relative position of the thermostat cam 240 to the screw projection 244. As shown more particularly in FIGS. 3, 6 and 8, an aperture 254 is formed in an end portion of the cam 240 for receiving a pivot pin 256 which may be passed through an end of a link lever 258. As shown in FIG. 6, the other end of the link lever 258 is pivoted to a generally central portion of my primary manual setting lever 154 by means of a pivot pin 309. Thus, the oven temperature setting may be readily adjusted by simply manually moving the push button 60 upwardly or downwardly across the front wall 64 of the oven toaster. It can be appreciated that as the push button is lifted, the primary manual setting lever 154 will be pivoted clockwise about its pivot 306 to lift the link lever 258 which in turn pivots the thermostat cam lever 240 in a clockwise direction about its shaft 242. This movement will result in a slidable movement of the smooth surface 250 of the cam 240 on the end of the screw 244 to cause the switch blade assembly 212 and 214 to be moved further and further away from the insulated button 238. Thus, the oven temperature setting is increased as the push button 60 is lifted along the front wall 64 of the oven toaster.

It can be appreciated that the oven thermostat 210 controls the temperature of the oven by sensing oven temperature directly through the aperture 228 in the sheet metal side plate 32. It also indirectly senses oven temperature by absorbing radiant energy directly from the electric heating elements 22, 23, 24 and 25. Briefly, the bimetal 224 of the thermostat senses oven load through the opening 228 in the side plate 32, and this direct sensing causes slightly longer and more frequent "on" cycles to occur when food is placed in the oven, which is necessary for the recovery of the oven temperature to the desired oven temperature which has been "set" by the position of the push button 60 on the front of the oven toaster. Since the bimetal 224 is also subjected to radiant energy emanating directly from the heaters 22, 23, 24 and 25, the quick and direct sensing of the radiant energy tends to shorten the "on" cycle thus preventing overshooting of the "set" temperature to thereby prevent excessive browning of the foods due to high amounts of radiant energy with excessive fluctuation of the temperature within the oven above the "set" temperature.

OVEN THERMOSTAT ANTICIPATOR

In order to further prevent overshooting of the temperature within the oven above the "set" temperature, I have added a uniquely arranged and positioned "heat pipe" and a heater for the heat pipe in order to have the bimetal 224 "anticipate" the temperature which has been "set" by knob 60. The anticipator mechanism is arranged to interrupt the flow of electric energy to the heaters 22, 23, 24 and 25 before the temperature "set" by knob 60 is reached within the oven. As shown more particularly in FIG. 17, the anticipator construction includes a "heat pipe" 213 formed of a relatively thin sheet of heat conductive aluminum. The heat pipe 213 is generally L-shaped and includes a mounting portion 215 and an outwardly extending portion 217.

A sheet of insulating material 219 is wrapped around the outer surface of the heat pipe 213 for suitably insulating an electric resistance ribbon wire 221 which may be wrapped around the insulation 219. Resistance wire 221 supplies heat to the heat pipe whenever upper heating element 23 is energized. As shown, one end 229 of the heater wire 221 is connected to a termination of the electric resistance wire heater 23 while the other end of the heater wire 221 is connected to switch blade 214 of the thermostat in order to complete the circuit through the heater wire.

The heat pipe 215 including its heater wire 221 and insulator 219 are conveniently mounted in close proximity to the bimetal 224 in order to conduct heat to the bimetal. As shown, a rivet 225 is passed through the bimetal 224, through the aluminum heat pipe 215, through a bimetal insulator member 235 and then through a generally rigid arm 233 of the thermostat bracket 222. With this unique construction, when the oven resistance wire heater 23 is energized the heater wire 221 which is wound around the insulator 219 of the heat pipe supplies heat through the aluminum heat pipe 213 directly to the bimetal 224 in the vicinity of the rivet 225, thus causing the thermostat bimetal 224 to "anticipate" the "set" temperature. At this time, however, the added mass of the heat pipe and its heat, plus the "fin" cooling effect of the heat pipe brings about a stabilizing effect on the bimetal, which causes a very uniform cooling rate of the bimetal. The added heat of the anticipator arrangement including the heat pipe 213 and its heater 221, coincident with its stabilizing effect immediately after the thermostat switch blades 232 and 234 have been opened results in a relatively uniform cyclic "on-off" curve.

The uniformity of cycling brings about a decided improvement in baking performance, but also, because of the very low amplitude in oven temperature fluctuation due to cycling makes calibration of the thermostat easier because essentially the temperature at any instant after an approximate 15 minute preheat is no more than a few degrees of the average oven temperature measured in the same manner when set at settings between 200° and 400°.

From the foregoing description it can be appreciated that my unique thermostat including its anticipator construction may be readily manufactured and assembled to provide a very reliable thermostat. The anticipator construction may be stamped and cut from sheets of aluminum and insulating material and may be readily riveted to the bimetal by means of a rivet 225. The bracket thermostat mounting bracket 222 is constructed with relatively rigid arms 246 and 226 for mounting the adjusting screw 244 and the bimetal 224 with its anticipator heat pipe 213. Moreover, the switch blade and ceramic insulator stack 216, 212, 218, 214 and 220 including the mounting shaft 242 are utilized for providing a pivot for the cam 240. It can be seen that this arrangement also results in a very reliable and readily calibrated thermostat since rotation of the cam 240 about the stack shaft 242 as a pivot allows the adjusting screw 244 to be solidly held in its rigid bracket 246. Clearly, calibration is easier because the screw 244 is on a solid member 246.

EFFECT OF OVEN OPERATION ON TOAST CYCLE

Figure 15:
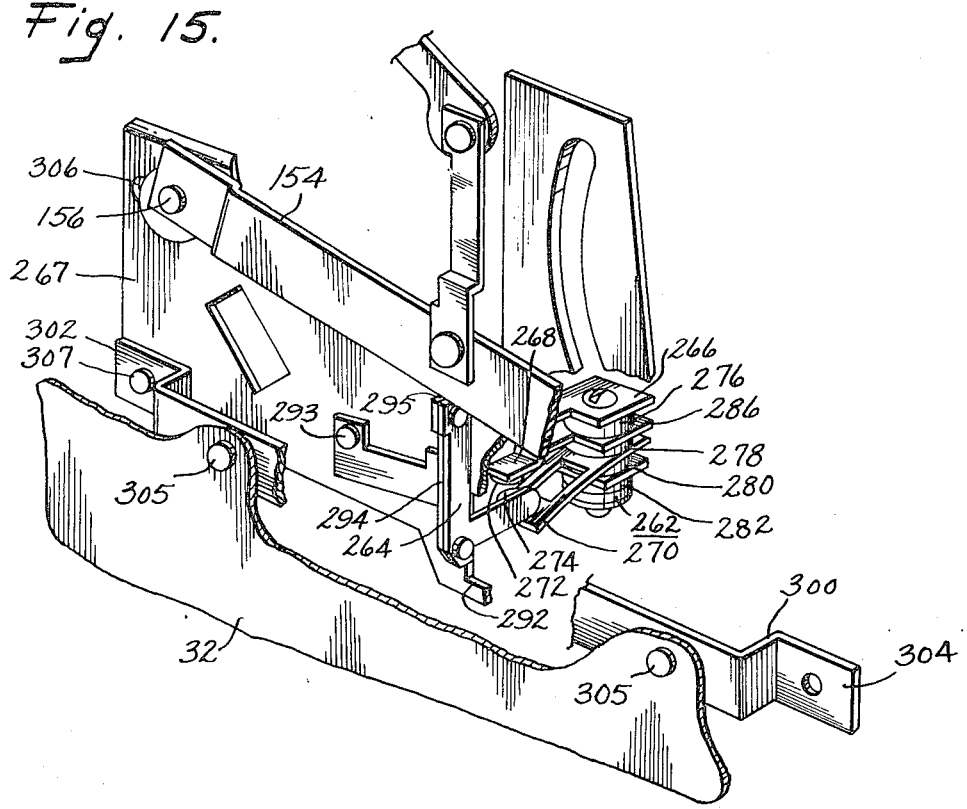
FIG. 15 is a fragmentary side perspective view of a function switch mechanism of the toaster control mechanism of the oven toaster shown in FIG. 3 showing the positions of the parts during a toasting cycle with the function switch in its open position.

A unique arrangement is provided for preconditioning the heat-up cool-down bimetal timer 82 so that a slice of bread may be toasted to the correct degree of brownness after the oven toaster has been used and operated as an oven. The heat-up cool-down bimetal timer is calibrated so that in spite of the fact that it takes less time to toast a slice of bread after the toasting chamber has been warmed by a prior toasting cycle the heat-up cool-down bimetal timer will toast the next succeeding slice of bread to the same degree of brownness without changing the toast setting on knob 62. To achieve this same effect after a prior oven operation, the heat-up cool-down bimetal timer is uniquely heated to the same degree that it would be heated by a preceding toast cycle. As shown in the circuit diagram illustrated in FIG. 2, a shunt resistor 260 and a function switch 262 are positioned in a circuit between the main switch 40 and the upper blade 112 of the bimetal heater switch 108. With this arrangement, when the push button 60 is moved from its middle "OFF" position upwardly to one of the oven temperature settings, the function switch 262 is permitted to close by the upward movement of an insulated tab 264 which is operated by the push button control lever 154, as shown in FIG. 15, Conversely, when the push button 60 is moved downwardly from its neutral "OFF" position the insulated tab 264 moves a switch blade 270 of the function switch 262 downwardly to thereby open the switch 262 and remove the resistance 260 from the circuit to the bimetal heater 106. By this unique arrangement the heat-up cool-down bimetal timer 82 may be readily preheated to the desired amount by simply adding a shunt resistor 260 and a function switch 262 to the circuitry for the oven toaster.

The mechanism for closing and opening the function switch 262 is achieved at a relatively low cost by the use of an insulated tab 264 which may be readily operated by the push button lever 154 which also controls energization of the main switch.

As shown more particularly in FIG. 15, the function switch 262 may be conveniently mounted on a bracket 266 which is fixed to a sheet metal mounting plate 267 for my primary manual setting mechanism. As illustrated, the function switch includes two switch blades 268 and 270 having contacts 272 and 274 mounted at the ends of the blades, respectively. A suitable stack of the ceramic insulators 276, 278 and 280 are positioned between and on opposite sides of the switch blades 268 and 270 in order to insulate the blades from the bracket member 266. The assembly also includes insulator 282 and terminals 286 and 288 to provide appropriate connection means for the circuitry illustrated in FIG. 2. As shown in FIG. 15, the insulated tab 264 extends through an aperture 292 which is formed in the sheet metal mounting plate 267. The tab 264 is connected to a lever 294 which is pivoted to the mounting plate 267 by a suitable rivet 293. As shown, the lever 294 includes an upper surface 295 for engagement with a lower surface of the primary manual setting lever 154.

With particular reference to FIG. 15, it can be appreciated that the lower switch blade 270 is wider than the upper blade 268 and it extends forwardly from the upper blade 268 for enabling the insulated tab 264 to operate the switch. With this construction, when the lower surface of the push button lever 154 is positioned up and away from the surface 295 of the function switch lever 294, the resiliency of the lower switch blade 270 moves the lower switch blade 270 upwardly against the force of the insulated tab 264 and its lever 294 to close the function switch 262. Conversely, when the push button 60 is depressed to lower the push button lever 154 to the toast position illustrated in FIG. 4, the lower surface of the lever 154 abuts the upper surface 295 of the function switch lever 294 to lower the lever 294 and the insulated tab 264 which is attached to the lever to move the lower switch blade 270 downwardly to open the function switch 262.

CIRCUIT DIAGRAM

The circuit for my improved oven toaster is illustrated in FIG. 2. As shown, it includes thermostat 212-214 for controlling energization of the heating elements 22, 23, 24 and 25 when the oven toaster is being operated as an oven, a heat-up cool-down bimetal timer 82 for timing a toasting cycle when the oven toaster is being operated as a toaster, a solenoid 132 for opening a main switch 40 at the end of a toasting cycle, a function switch and shunt resistor 262 and 260 for permitting a limited amount of current to flow to the bimetal heater 106 to provide a limited amount of current to preheat the bimetal when the oven toaster is being operated as an oven, and an indicator lamp 296 for indicating that the main switch 40 has been closed and that power is being supplied to the appliance. In the light of the foregoing discussion, it can be generally appreciated that when it is desired to operate the oven toaster as an oven, the main switch 40 should be closed, the function switch 262 should be closed, the heat-up cool-down bimetal timer should be prevented from energizing the solenoid 132 to open the main switch, and the actuating pin 236 on switch blade 212 of the thermostat should be placed in relative close proximity to the insulator button 238 of the thermostat bimetal 224 to permit the thermostat switch 232 and 234 to regulate the temperature within the oven.

When it is desired to operate the oven toaster as a toaster, it can be seen that the main switch 40 should be closed, the function switch 262 should be opened to permit full current to flow through the bimetal heater 106 of the heat-up cool-down bimetal timer, and the bimetal timer 82 should be placed in its operative position wherein switch blade 112 is allowed to move upwardly at the end of the bimetal heat-up cycle to place the switch contacts of the bimetal heat-up cool-down timer in their cool-down position with switch contacts 108 and 109 open and switch contacts 116 and 118 closed. Moreover, the oven thermostat should be moved to the position illustrated in FIG. 9 wherein the set screw projection 244 is placed on the highest surface 252 of the thermostat cam for camming the thermostat switch blades 212 and 214 far away from the bimetal insulator button 238 to prevent the bimetal 224 from controlling the temperature within the oven toaster.

PRIMARY MANUAL SETTING MECHANISM

According to my invention there is combined with the aforedescribed oven toaster heat-up cool-down bimetal timer 82 and oven thermostat 212, a unique primary manual setting mechanism including a lever and latch construction for moving the control components to a plurality of oven temperature positions, an off position, or a toast position. As shown more particularly in FIGS. 4, 5 and 6, the primary manual setting mechanism includes a sheet metal plate 267 which is positioned between the oven thermostat 212 and 214 and the toaster carriage link 28. It is held spaced away from the sheet metal side plate 32 of the oven toaster by means of a bracket 300 which may be riveted or otherwise secured to the sheet metal side plate 32. The bracket 300 includes two outwardly extending arms 302 and 304, and the sheet metal mounting plate 267 of the manual setting mechanism may be connected to the bracket 300 by means of screws 305 and 307 or other suitable securing means.

The mounting plate 267 includes a generally horizontal short pivot slot 306 and a generally vertical elongated slot 308 for mounting my unique push button lever 154. As shown, a rivet 156 having a head portion 157 is fixed to one end of the push button lever 154 for pivotally mounting the lever at the slot 306. It can be seen that the lever 154 is positioned on one side of the mounting plate 267 in the vicinity of the pivot slot 306 while the head 157 of the rivet is positioned on the other side of the mounting plate 267. Thus, the rivet 156 which is fixed to the push button lever 154 can rotate and slide within pivot slot 306 as the push button lever 154 is raised and lowered.

In order to smoothly guide the push button lever 154 as it is rotated within its pivot slot 306, a pin 310 is staked to a central portion of the lever 154 for holding a roller 312 which is received within the vertical slot 308.

My primary manual setting mechanism also includes the link lever 258 for controlling operation of the thermostat cam 240 which is pivotally mounted on a central portion of the push button lever 154 by a rivet 309. As shown, the upper portion of the lever 258 is provided with an outwardly extending pin 256 for receiving an aperture 254 which is formed in the end of the cam lever 240.

As generally indicated in the foregoing discussion, my unique primary manual setting mechanism and particularly the push button lever 154 operates a mechanism for opening and closing main switch 40. As shown more particularly in FIGS. 4, 5 and 6, this main switch operating mechanism includes a rotatable cam 162 which is pivotally mounted on the primary manual setting mechanism mounting plate 267 by means of a rivet 164. The cam is generally circular in shape and it includes a slot 165 for receiving a drive pin 160 which is fixed to and extends outwardly from the push button lever 154. With this construction, it can be appreciated that upward and downward pivotal movement of the push button lever 154 will rotate the cam 162 in a clockwise or counterclockwise direction about its pivot 154. It can be seen that upon upward movement of the push button lever 154, the pin 160 will abut an upper right surface of the slot 165 to move the cam 162 in a counterclockwise direction. Conversely, downward movement of the push button lever 154 will cause the drive pin 160 to abut the opposite surface of the slot 165 to cause the cam 162 to be rotated in a clockwise direction.

The cam 162 is provided with an off notch 169 and raised cam surfaces 171 and 173 on opposite sides of the off notch for controlling actuation of the main switch actuating levers 74, 76 and 80. With particular reference to FIG. 5, it can be appreciated that when a detent lug 166 of the switch actuating levers is positioned in the off notch the main switch 40 is in its open position. The operation of the main switch has been generally described in the foregoing discussion, and it can be appreciated that when the wire switch actuating lever 80 is moved downwardly the switch is closed, and when it is allowed to move upwardly the switch is moved to its open or off position illustrated in FIG. 5.

A readily formed switch actuating lever mechanism 71–73, and 74–78 is positioned between the cam 162 and the wire actuating lever 80. As shown, the mechanism includes an intermediate lever 71–73 which is pivotally mounted at 75 to the primary manual setting mechanism support plate 267, and an actuating lever 74–78 which is pivotally mounted to the intermediate lever 71–73 by means of a pivot 75.

A cam lever 316 is provided for cooperating with cam 162 to resiliently urge the cam 162 in a clockwise or counterclockwise direction. As shown, a spring 314 is positioned between the upper vertical arm 71 of the intermediate lever and the cam lever 316, and the lever 316 may be conveniently pivoted to the support plate 267 by means of a pivot 318. With this construction, the spring 314 which normally holds detent 166 into the off notch 169 of cam 162 also urges lever 316 to the left.

My primary manual setting mechanism also includes a latch and lever arrangement for holding the lever 154 in the toast position illustrated in FIG. 4 with the main switch 40 closed until the heat-up cool-down bimetal timer 82 has completed a cycle of operation and it is desired to automatically open the main switch. As shown in FIG. 4, the mechanism includes a latch lever 90 which may be pivotally mounted at 148 to the support plate 267. A hook latch portion 150 is formed above the pivot 148 for gripping a pin 152 to hold the push button lever 154 in the toast position illustrated in FIG. 4. As shown, the latch pin 152 is fixed to a lever 320 which may be suitably pivotally mounted on a forward portion of the push button lever 154 by a pivot pin 322. The lever 320 is provided with an upper projecting portion 324 for normally holding the lever and the detent pin 152 in the position illustrated in FIG. 6 with the projection 324 resting on the upper surface of the latch lever 154.

With particular reference to the toast position shown in FIG. 4 and the OFF position illustrated in FIG. 5, it can also be appreciated that the push button lever 154 is normally spring urged to the OFF position by the spring 158 which moves a tab 338 of lever 154. As illustrated in FIGS. 4, 5 and 6, two tabs 326 and 328 are integrally formed with the mounting plate 267. They extend outwardly from the mounting plate, and apertures 330 and 332 are formed in each of the tabs 326 and 328, respectively, for receiving a slidable rod plunger member 334. As shown, plunger 334 includes a head portion 336, and the spring 158 is positioned between the head 336 of the plunger and the upper surface of tab 326.

The upper surface of the head of the plunger 334 is arranged for cooperation with the outwardly extending tab 338 which is integrally formed with the push button lever 154. In order to provide smooth guiding contact between the head 336 of the plunger 334 and the tab 338, a plastic button 337 may be positioned on the lower surface of tab 338. As illustrated in FIG. 6, a reduced diameter portion 339 of the button 337 may extend through an aperture which is formed in tab 338 for connecting the button to the tab.

With this construction, it can be seen that the push button lever 154 may be moved downwardly so that the lower surface of the button 337 abuts the top of head 336. As shown in FIG. 5 upon downward movement by a user into the off position, spring 314 is urged into the off notch 169 of the cam 162 to rotate the cam 162 in a clockwise direction to move its drive pin 160 and the push button lever 154 to which it is attached downwardly, gravity urges the lever 154 downwardly, and spring 80 also urges the lever 154 downwardly until the lower surface of tab 338 abuts the head of plunger 336. The spring 158 acting between the head 336 of the plunger and the upper surface of tab 326 prevents further downward movement of the tab 338.

In order to limit upward movement of the plunger 334, a "C" washer 340 may be snapped onto a groove formed in the plunger. As shown in FIG. 5, the upper surface of the "C" washer cooperates with a lower surface of tab 326 to limit upward movement of the plunger 334 under the influence of spring 158.

The previously mentioned solenoid operated latch 140–142 is also pivotally mounted on my primary manual setting mechanism mounting plate 267. As shown, the solenoid operated lever and latch includes a generally vertical lever portion 88 and a generally horizontal latch lever portion 140. A tab 342 extends from the major portion of the solenoid lever 88 and is arranged generally parallel to the latch lever 140 for supporting the latch lever 140 and the solenoid lever 88 on a shaft 145. As shown, the latch lever 140 and the tab 342 are provided with apertures 344 and 346, respectively, for mounting the solenoid lever 88 and its integrally formed latch lever portion 140 on the shaft 145 which may be fixed to the mounting plate 267. The upper portion of the solenoid lever 88 includes a slotted portion 348 for connection with an axially movable plunger 134 of the solenoid 132. The plunger 134 of the solenoid lever 88 and its latch lever 140 in a counterclockwise direction, and when the solenoid is energized by the flow of electric current through its coil the plunger 134 is moved inwardly against the force of the internal spring of the solenoid to pivot the solenoid lever 88 and its latch lever 140 in a clockwise direction about their common pivot shaft 145.

With this unique construction it can be appreciated that when the push button lever 154 is depressed from its OFF position illustrated in FIG. 5 to its TOAST position illustrated in FIG. 4, the tab 338 and its button 337 are brought into engagement with the upper surface of head 336 of the plunger 334 to move the plunger and the push button lever 154 downwardly against the force of spring 158. Continued downward motion causes the lug 152 to be moved into engagement with the hook 150 of latch lever 90 to pivot latch lever 90 counterclockwise to move pin 144 into notch 142 of latch 140 to hold the push button lever 154 in the TOAST position illustrated in FIG. 4 when the push button is released. This downward motion of the push button lever 154 also moves the cam drive pin 160 downwardly to rotate the cam 162 from the OFF position illustrated in FIG. 5 to the TOAST position illustrated in FIG. 4 wherein the detent lug 166 is moved from the off notch 169 downwardly onto the toast cam surface 173. This rotational movement of the cam 162 thus causes downward movement of the lug 166, clockwise movement of lever 71–73 abut pivot pin 67 and downward movement of the switch actuating lever 72–78. Thus, with the door 16 in its closed position so that lug 68 is in a position behind pivot 75 this downward movement causes the right side of lever 72–78 to abut lug 68 to cause counterclockwise movement of the lever 78 to move the spring switch actuating lever 80 downwardly to thereby close the switch.

OVEN OPERATION

When it is desired to operate my improved oven toaster as an oven, the food to be cooked is inserted within the cooking chamber 15, and the front door 16 is closed to move the carriage lug 68 and its sleeve bearing 70 rearwardly to the position illustrated in FIG. 6 to permit the switch actuating lever 72–78 to close the main switch 48 and 51. Then the push button 60 is lifted from its OFF position to any one of the plurality of oven temperature setting positions indicated on the front plate 64. This movement causes the pivoted push button lever 154 to be moved from its OFF position indicated in FIG. 5 to one of its oven temperature setting positions illustrated in FIG. 6. In moving from the position illustrated in FIG. 5 to the position illustrated in FIG. 6, the cam drive pin 160 which is fixed to lever 154 is lifted and slides against the upper surface of a slot 165 which if formed in the cam 162 to rotate the cam 162 about its pivot 164. This movement causes the detent lug pin 166–168 to be moved out of the OFF notch 169 of the cam 162 and onto the smooth circular surface 171 of the cam 162 to the left of the OFF notch 169, as illustrated in FIG. 6. This movement causes the detent lug 166–168 and the lever 71–73 to which it is attached to be moved downwardly against the force of spring 314 from the position illustrated in FIG. 5 to the position illustrated in FIG. 6. This downward movement of the lever 71–73 causes corresponding downward movement of the pivot 75 for the main switch actuating lever 72–78, which causes the lower portion of arm 72 of the lever to abut an upper surface of the carriage lug 68–70 to pivot the lever 72–78 about pivot pin 75 thereby moving the left arm 78 of the lever downwardly to move spring 80 downwardly to rotate the cam 82 to close the main switch contacts 48 and 51.

With the main switch 40 closed at the beginning of OVEN operation, the thermostat switch contacts 232 and 234 are also closed as shown in FIG. 8. In this position it can also be appreciated that upward movement of the push button lever 154 from the off position illustrated in FIG. 5 to the oven position illustrated in FIGS. 6 and 8 causes the thermostat cam 240 to be moved from its off notch 248 on lug 244 to one of its on positions on lug 244. It can be seen that when the cam 240 is rotated from its off position illustrated in FIG. 7 to one of its on positions illustrated in FIG. 8, the on cam surface 250 of the cam 240 gradually slides on the end of projection 244 to move the thermostat switch blades 212 and 214 and the pin projection 236 further and further away from the bimetal insulator 238. Thus, as the distance between the end of pin 236 and the ceramic insulator 238 increases, the further the bimetal 224 has to travel to open the switch contacts 232 and 234, and hence, the higher the temperature setting of the oven. As shown by the indicia on the front plate 64 of the oven toaster, the lower oven temperature settings are located near the off position while the higher temperature settings are indicated at the top of the front plate 64. With the oven thermostat in the on position illustrated in FIG. 8, the thermostat 210 maintains the oven at the temperature set on the dial at the front of the oven toaster by the action of the bimetal 224 in opening and closing the contacts 232 and 234 of the thermostat.

While the oven toaster is being operated as an oven the heat-up cool-down bimetal timer 82 is prevented from moving into its cool-down cycle to thereby prevent the heat-up cool-down bimetal timer from opening the main switch 48 and 51. As shown in FIGS. 3, 6 and 11, this is achieved by the position of the timer actuator 92 which is controlled by the latch mechanism 146, and particularly its pin 206–207. As shown in FIG. 11, the pin 206 simply rests on the actuator 92, and in this position the spring 93 of the actuator causes the actuator to be rotated clockwise to move the actuator arm 115 to the bottom of slot 117 to lower switch blade 110 to thereby maintain switch contacts 116 and 118 in their open position to prevent movement of the heat-up cool-down bimetal timer to its cool-down position.

During OVEN operation, an arrangement is provided for supplying a limited flow of current to the bimetal heater 106 in order to preheat the bimetal to about the same amount that it would be preheated by a TOAST cycle operation. Thus, should the oven toaster be used for toasting a slice of bread immediately following its use as an oven, the preheated timer 82 will properly control the degree of brownness of the toast. With particular reference to FIGS. 2 and 15, this is achieved by closing the function switch 262 during the oven operation to supply a limited amount of current to the bimetal heater 106 through the shunt resistor 260. As shown in FIG. 15, the function switch 262 is closed as the push button lever 154 is lifted from the OFF position illustrated in FIG. 5 to the OVEN position illustrated in FIG. 6 to provide current to the bimetal heater 106 during OVEN operation.

While the oven toaster is being operated as an oven, it should be appreciated that should the front door 16 be opened even a small amount, the flow of current to the heating elements will be immediately stopped by opening the main switch 40. This results since even a slight opening of the door moves pin 68 and its sleeve bearing 70 forwardly from the position illustrated in FIG. 3 to allow the main switch spring blades 44 and 48 to rotate the switch cam 83 to the OFF position illustrated in FIG. 5. The spring blades themselves are strong enough to move the cam 83 downwardly when the spring actuator 80 is allowed to be moved slightly upwardly to pivot lever 72-78 clockwise as the pin 68 and its sleeve 70 are moved forwardly when the door 16 is opened.

TOASTER OPERATION

Should it be desired to use the oven toaster to toast a slice of bread after it has been used as an oven, it is merely necessary to place one or more slices of bread on the food rack 4, close the door, and move the push button 60 downwardly from its OFF position to its TOAST position. If the toast brownness knob 62 had been previously set to the desired brownness, there is normally no reason to make any adjustment in the brownness control knob 62 since the bimetal 102 of the timer 82 would have been preheated through the shunt resistor 260 and the function switch 262 while the cooking chamber was being used as an oven. Thus, the cooking chamber 15 and the heat-up cool-down bimetal timer 82 would be at about the same relative temperature with respect to each other following oven operation as they would be at the end of a prior toasting operation. Accordingly, the position of the rotatable brownness control knob 62 does not have to be adjusted unless it is desired to make a darker or lighter slice of toast then had been obtained during a prior toasting operation.

When the push button knob 60 is moved downwardly from its OFF position illustrated in FIG. 5 to its TOAST position illustrated in FIG. 4, a number of things happen almost simultaneously. The rotatable cam 162 is rotated in a clockwise direction about its pivot 164 by the drive pin 160 which is fixed to and moves downwardly with the push button lever 154. As the pin 160 rotates the cam 162, rotation of the cam forces the detent lug 166 out of the off notch 169 against the force of spring 314 to position the detent lug on the raised toast cam surface 167 of the rotatable cam 162. This results in a downward motion of lever 71-73 to cause a downward movement of the pivot 75 for lever 72-78. Since the door is in its closed position, the outwardly extending pin 68 on the food carriage link 28 is in the position illustrated in FIGS. 4 and 5. Thus, when the pivoted lever 154 is moved from the position shown in FIG. 5 to the position shown in FIG. 4, downward movement of the pivot 75 rotates the lever 72-78 in a counterclockwise direction to move the switch actuator lever 80 downwardly to thereby rotate the cam 83 to close switch contacts 48-51 to energize the heating elements to toast a slice of bread.

During movement of the lever 154 from the OFF position shown in FIG. 5 to the TOAST position shown in FIG. 4, the movement is opposed by the coil spring 158 which is compressed between the plastic button 337 which is fixed to the forward tab 338 of the push button lever and the outwardly extending tab 326 which is formed on supporting plate 267. Downward movement of the lever 154 also causes downward movement of lever 320 and the lug 152 which extends outwardly from lever 320. This downward movement of lug 152 causes it to move into the latch slot 150 of lever 146 to pivot the lever 146 in a counterclockwise direction about pivot pin 148. Counterclockwise movement of lever 146 causes a generally rearward movement of the lugs 144 and 206 which are attached to the lower portion of lever 146. Lug 144 cooperates with a latch notch 142 which is formed in the solenoid lever 88-140, and thus, rearward movement of the lug 144 on the lower surface of lever 140 allows the lug and its sleeve bearing 161 to roll or slide rearwardly until they are positioned within the notch 142. At that time further rearward movement is restricted by the rear surface of the notch. During this rearward movement of the lug 144 on the lower surface of lever 140, an internal spring of the solenoid 132 urges the solenoid lever 88-140 in a counterclockwise direction about pivot pin 346. Thus, when the pin 144 reaches the notch 142, the entire solenoid lever 88-140 is pivoted in a counterclockwise direction by the internal spring of the solenoid to move the lug 144 into notch 142. Accordingly, as shown in FIG. 4 latch notch 142 holds latch lever 146 which in turn holds the lug pin 152 of lever 320 to hold the primary manual setting lever 154 in its downward TOAST position against the force of spring 158 during the entire toasting cycle.

At the same instant that the lug 144 is moved rearwardly into the latch notch 142, lug 206 and its sleeve bearing 207 is also moved rearwardly to move the bimetal timer actuator 92 from its OFF position illustrated in FIG. 11 to its TOAST position illustrated in FIG. 12. This movement is resiliently opposed by spring 93 which normally holds the actuator 92 and its lug 115 downwardly to prevent contacts 108-109 from being opened and contacts 116-118 from being closed to thereby prevent the heat-up cool-down bimetal timer 82 from shifting from its heat-up cycle to its cool-down cycle. Thus, at the beginning of the TOAST cycle lug 206 and its sleeve bearing 207 pivots the bimetal actuator 92 clockwise to lift lug 115 above switch blade 110 to permit the switch blade to be moved upwardly at the end of the bimetal heat-up cycle to permit cool-down operation of the timer 82.

When the push button lever 154 is moved downwardly from its OFF position illustrated in FIG. 5 to its TOAST position illustrated in FIG. 4, it operates on the top surface of the insulated tab 264 and lever 294 to move the insulated tab 264 downwardly to open the function switch 262 during the TOAST cycle. Thus, the shunt resistor 260 is effectively removed from the circuit during the toasting cycle and the full current is applied to the bimetal heater wire 106 during the toasting cycle.

The parts of the bimetal heat-up cool-down timer remain in the positions illustrated in FIGS. 2, 12 and 14 during the bimetal heat-up cycle. As the bimetal 102 is heated, its central portion bulges outwardly away from the generally vertical wall 98 to move the switch lever 110 which is connected to it from the position illustrated in FIG. 14 to the position illustrated in FIG. 13. When the switch lever reaches the position shown in FIG. 13, it has moved far enough outwardly from a plastic lug 114, which is integrally formed with the vertical wall 98 of the bimetal support, that it moves out from under the lug 114. Since the switch lever 110 is normally spring biased upwardly it slides upwardly on the outer surface of the lug 114 to move the transverse switch blade 112 upwardly to close contacts 116-118 and open contacts 108-109 to thereby terminate the flow of current to the bimetal heater wire 106 to place the bimetal heat-up cool-down timer in its cool-down position. The contacts 116-118 remain closed to permit a continuous flow of current to the heating elements 22, 23, 24 and 25 of the oven toaster while the oven toaster bimetal timer 82 is in its cool-down cycle.

As the bimetal 102 cools down, its left end which is provided with contact 124 moves toward a contact screw 126. This occurs since the switch blade 110 is now restrained from moving inwardly from the position shown in FIG. 13 to the position shown in FIG. 14 by the abutment 114. Thus, the contact 124 at the end of the bimetal 102 moves toward the contact screw 126 during the bimetal cool-down cycle.

As shown in FIG. 2, when the contact 124 is moved into engagement with contact screw 126, the circuit to the solenoid 132 is closed, and with reference to FIGS. 4 and 5 the solenoid 132 pulls the solenoid lever 88 to the right about its pivot pin 344 to cause the hammer 136 to ring the bell 138 to indicate the end of a toasting cycle. At the same instant, the solenoid lever 88 lifts its arm 140 to release lug 144 from latch notch 142 to allow lever 146 to pivot clockwise under the force of springs 158 and 93 to release latch notch 150 from pin 152 to permit the primary manual setting lever 154 to be moved upwardly to its OFF position illustrated in FIG. 5. At the same instant that the lever 154 is moved upwardly, its cam 162 is rotated in a counterclockwise direction to move the detent lug 166 from the TOAST cam surface 167 into the OFF notch 169. During this movement, it can be appreciated that the lever 71–73 is moved upwardly by spring 314 to move pivot 75 upwardly to allow lever 72–78 to be rotated in a clockwise direction about pivot 75 to lift the end of lever 78 and the spring actuating lever 80 of switch 40 to open the main switch contacts 48–51.

From the foregoing description it will be appreciated that my improved control mechanism for operating an oven toaster as both an oven and a toaster is achieved with the use of relatively few parts which are uniquely related to each other for achieving the rather complex objectives of a control for accurately regulating the temperature of an oven and also timing the duration of a toasting cycle. It should also be appreciated that my unique mechanism is so related to the carriage link pin 68 and the door of the oven toaster that whenever the door is opened the power from the main switch is interrupted. The arrangement of my primary manual setting mechanism including a push button lever and various latches and cams between an oven thermostat and a timer for controlling the toasting cycle permits the use of a subassembled oven thermostat 210, a separate subassembled heat-up cool-down timer 82 and a subassembled main switch 40. Moreover, the primary manual setting mechanism including its supporting plate 267, solenoid 132 and the latches 146 and 142 may also be provided as a subassembly. Thus, in assembling my unique mechanism to a side portion of a toaster, it is merely necessary to attach the oven thermostat assembly 210 by a screw or rivet, use two screws 305 and 307 to attach the primary manual setting mechanism to the oven toaster, and locate the heat-up cool-down bimetal timer 82 and the main switch 40 in their appropriate positions.

Accordingly, it will be appreciated that the parts of my unique control mechanism may be readily connected to each other and to a sheet metal wall of the toaster. Thus, an exceedingly simple, yet reliable oven toaster control mechanism has been achieved.

What I claim is:

1. An electric oven toaster construction having front and side walls comprising:
   a. a cooking and toasting chamber;
   b. electric heating means positioned in said oven toaster for supplying heat to said chamber for cooking and toasting purposes;
   c. an oven thermostat having an off position and a plurality of on positions mounted on said oven toaster for controlling energization of said heating means when said oven toaster is being used as an oven;
   d. a toast timer spaced from said oven thermostat and including an actuator for permitting or preventing operation of said timer for controlling said heating means when said oven toaster is being used as a toaster, said actuator being movable to an off position for preventing operation of said timer to control a toasting cycle; and
   e. a primary manual setting mechanism mounted for movement to any one of a plurality of positions to control operation of said oven thermostat and said timer, said primary manual setting mechanism having an off position for retaining said oven thermostat and said toast timer actuator in their off positions; said primary setting mechanism being movable in one direction from its off position for moving said oven thermostat to any one of a plurality of positions for varying the temperature setting of said oven thermostat and to prevent the timer from controlling energization of the heating means to thereby allow the oven thermostat to control energization of the heating means for operating the oven toaster as an oven; said primary manual setting mechanism being movable in another direction from said off position for preventing said oven thermostat from controlling energization of said heating means and permitting said toast timer to stop the flow of electric current to said heating means at the end of a toasting cycle.

2. An electric oven toaster construction as defined in claim 1 wherein said toast timer includes a toast time setting member spaced from the primary manual setting mechanism so that said primary manual setting mechanism may be moved to any of its plurality of positions without changing the position of the toast time setting member.

3. An electric oven toaster construction as defined in claim 1 wherein said primary manual setting mechanism includes:
   a. a primary manual setting lever pivotally mounted on said oven toaster; and
   b. a spring loaded plunger for moving said lever to its off position for retaining said oven thermostat and said toast timer in their off positions.

4. An electric oven toaster construction as defined in claim 1 wherein said primary manual setting mechanism includes:
   a. a primary manual setting lever pivotally mounted on said oven toaster;
   b. a cam rotatably mounted on said oven toaster adjacent to said pivoted lever;
   c. means on said pivoted lever and said rotatable cam for causing corresponding rotatable movement of said cam as said lever is moved from one position to another position;
   d. a radially inwardly extending off notch formed on said cam member; and
   e. a detent lug resiliently urged into contact with said cam member for resiliently holding said lever and said cam member in an off position the detent in the off notch formed on said cam member.

5. An electric oven toaster construction as defined in claim 4 wherein a raised cam surface is formed on one side of said off notch for controlling operation of said electric heating means when said lever is moved in one direction from its off position for operating the oven toaster as an oven, and a raised cam surface is formed on the other side of said notch for controlling said electric heating means when said oven toaster is operated as an oven.

6. An electric oven toaster construction as defined in claim 4 wherein said primary manual setting mechanism further includes:
   a. a main switch having an on and an off position for controlling energization of said heating means;
   b. an intermediate lever pivotally mounted on said oven toaster for moving said switch to its on or off positions, said detent lug being mounted in said intermediate lever; and
   c. spring means connected to said intermediate lever for resiliently urging said intermediate lever toward said rotatable cam to maintain said detent lug in continuous contact with said rotatable cam.

7. An electric oven toaster construction as defined in claim 6 wherein said primary manual setting mechanism further includes:
   a. a switch actuating lever having a central portion and two outwardly extending portions, the central portion of said actuation lever being pivoted to said intermediate lever, one of said outwardly extending portions being connected to a switch actuating member and the other outwardly extending arm being positioned for engagement with a lug to permit movement of the switch to its on position only when the lug is in engagement with said other arm of said lever.

8. An electric oven toaster construction as defined in claim 7 wherein said oven toaster construction further includes:
   a. a door pivotally mounted on the oven toaster for opening and closing the cooking and toasting chamber;
   b. a carriage for holding food positioned within said cooking and toasting chamber and connected to said door so that it is moved partially out of the cooking and toasting chamber when the door is opened; and
   c. a carriage link connected to said food carriage and moved forwardly and rearwardly adjacent to said primary manual setting mechanism as the door is opened and closed, said detent lug being mounted on said carriage link and positioned adjacent to said switch actuating lever for holding one of the arms of said switch actuating lever when the door is in its closed position to thereby permit the primary manual setting mechanism to close the main switch, said lug being moved forwardly away from said switch actuating lever when the door is opened to thereby prevent said switch actuating lever from being pivoted by said primary manual setting lever to close the main switch.

9. An electric oven toaster construction as defined in claim 4 wherein said primary manual setting mechanism further includes:
   a. a latch lever pivotally mounted on said oven toaster for holding said primary manual setting lever downwardly in its toast position to hold the main switch closed, and also for holding the actuator of said timer for permitting operation of the timer for controlling the heating means when the oven toaster is being used as a toaster.

10. An electric oven toaster construction as defined in claim 9 wherein said primary manual setting means further includes:
    a. a solenoid operated latch lever for holding said primary manual setting latch lever in the toast position until the solenoid is operated by said timer to trip the solenoid latch lever and the primary manual setting latch lever to open the main switch.

11. An electric oven toaster construction as defined in claim 3 wherein said oven toaster construction further comprises:
    a. a side plate;
    b. a bracket fixed to said side plate;
    c. a primary manual setting mechanism mounting plate arranged generally parallel to said side plate and fixed to said bracket;
    d. a generally horizontal slot formed in said mounting plate and a generally vertical arcuate slot formed in said mounting plate;
    e. said primary manual setting lever being pivotally mounted in said generally horizontal slot; and f. a sleeve roller connected to said pivotally mounted lever and extending through said generally vertical slot for slidably guiding said lever as it is moved upwardly and downwardly in said generally vertical arcuate slot.

12. An electric oven toaster construction having two generally vertical side walls, a generally horizontal top wall and a front opening comprising:
   a. a door pivotally mounted to the lower portion of each of the side walls for selectively opening or closing the front opening of the oven toaster;
   b. a carriage operably connected to said door and mounted for forward and rearward movement as the door is opened and closed;
   c. a cooking and toasting chamber;
   d. electric heating means positioned in said oven toaster for supplying heat to said chamber for cooking and toasting purposes;
   e. an oven thermostat having an off position and a plurality of on positions mounted on said oven toaster for controlling energization of said heating means when said oven toaster is being used as an oven;
   f. a heat-up cool-down bimetal timer including an actuator for permitting or preventing operation of said heat-up cool-down bimetal timer for controlling said heating means when said oven toaster is being used as a toaster, said actuator being movable to an off position for preventing operation of said heat-up cool-down bimetal timer to control a toasting cycle; and
   g. a primary manual setting mechanism mounted for movement to any one of a plurality of positions to control operation of said oven thermostat and said heat-up cool-down bimetal timer, said primary manual setting mechanism having an off position for retaining said oven toaster thermostat and said heat-up cool-down bimetal timer actuator in their off positions; said primary setting mechanism being movable in one direction from its off position to an oven position for moving said oven thermostat to any one of a plurality of positions for varying the temperature setting of said oven thermostat and to prevent the heat-up cool-down timer from controlling energization of the heating means to thereby allow the oven thermostat to control energization of the heating means for operating the oven; said primary manual setting mechanism being movable in another direction from said off position to a toast position for preventing said oven thermostat from controlling energization of said heating means and permitting said heat-up cool-down bimetal timer to stop the flow of electric current to said heating means at the end of a toasting cycle.

13. An electric oven toaster construction comprising:
   a. two side plates spaced from each other, one of said side plates including a lower outwardly extending portion for forming a bottom wall of a control chamber;
   b. a cooking and toasting chamber located between said side plates;
   c. two outside walls connected to each of said side plates, one of said outside walls being connected to said bottom wall for closing said control chamber;
   d. electric heating means positioned in said oven toaster for supplying heat to said chamber for cooking and toasting purposes;
   e. an oven thermostat having an off position and a plurality of on positions mounted on said oven toaster for controlling energization of said heating means when said oven toaster is being used as an oven;
   f. a heat-up cool-down bimetal timer including an actuator for permitting or preventing operation of said heat-up cool-down bimetal timer for controlling said heating means when said oven toaster is being used as a toaster, said actuator being movable to an off position for preventing operation of said heat-up cool-down bimetal timer to control a toasting cycle; and
   g. a primary manual setting mechanism mounted for movement to any one of a plurality of positions to control operation of said oven thermostat and said heat-up cool-down bimetal timer, said primary manual setting mechanism having an off position for retaining said oven toaster thermostat and said heat-up cool-down bimetal timer actuator in their off positions, said primary setting mechanism being movable in one direction from its off position to an oven position for moving said oven thermostat to any one of a plurality of positions for varying the temperature setting of said oven thermostat and to prevent the heat-up cool-down timer from controlling energization of the heating means to thereby allow the oven thermostat to control energization of the heating means for operating the oven; said primary manual setting mechanism being movable in another direction from said off position to a toast position for preventing said oven thermostat from controlling energization of said heating means and permitting said heat-up cool-down bimetal timer to stop the flow of electric current to said heating means at the end of a toasting cycle.

14. An electric oven toaster construction as defined in claim 13 wherein said heat-up cool-down bimetal toaster timer is connected to the bottom wall of said control chamber by a tab which is integrally formed with said bottom wall.

15. An electric oven toaster construction having front and side walls comprising:
   a. a cooking and toasting chamber;
   b. electric heating means positioned in said oven toaster for supplying heat to said chamber for cooking and toasting purposes;
   c. an oven thermostat having an off position and a plurality of on positions mounted on said oven toaster for controlling energization of said heating means when said oven toaster is being used as an oven;
   d. a toast timer including a toaster timer control actuator having an off position and an on position mounted on said oven toaster for controlling said heating means when said oven toaster is being used as a toaster; and
   e. a primary manual setting mechanism including a push button lever mounted at the side of said oven toaster and extending through the front wall of said oven toaster, said push button lever being mounted for movement to any one of a plurality of positions to control operation of said oven thermostat and said toaster timer control actuator; said primary manual setting mechanism having an off position for retaining said oven thermostat and said toaster timer control actuator in their off positions; said push button lever being movable upwardly from its off position for moving said oven thermostat to any one of a plurality of positions for varying the temperature setting of said oven thermostat, and to prevent the toaster timer control actuator from controlling energization of the heating means to thereby allow the oven thermostat to control energization of the heating means for operating the oven; said push button being movable downwardly from said off position for preventing said oven thermostat from controlling energization of said heating means and permitting said toast timer to stop the flow of electric current to said heating means at the end of a toasting cycle.

16. An electric oven toaster construction having a side plate comprising:
 a. a cooking and toasting chamber;
 b. electric heating means positioned in said oven toaster for supplying heat to said chamber for cooking and toasting purposes;
 c. an aperture formed in said side plate;
 d. an oven thermostat connected to said side plate in the vicinity of said aperture, said oven thermostat including a bimetal temperature sensing blade positioned over said aperture for sensing the temperature within said cooking chamber;
 e. a heat-up cool-down bimetal timer including an actuator for permitting or preventing operation of said heat-up cool-down bimetal timer for controlling said heating means when said oven toaster is being used as a toaster, said actuator being movable to an off position for preventing operation of said heat-up cool-down bimetal timer to control a toasting cycle; and
 f. a primary manual setting mechanism including a push button lever mounted for movement to any one of a plurality of positions to control operation of said oven thermostat and said heat-up cool-down bimetal timer, said primary manual setting mechanism having an off position for retaining said oven toaster and said heat-up cool-down bimetal timer in their off positions; said primary setting mechanism being movable in one direction from its off position for moving said oven thermostat to any one of a plurality of positions for varying the temperature setting of said oven thermostat and to prevent the heat-up cool-down timer from controlling energization of the heating means to thereby allow the oven thermostat to control energization of the heating means for operating the oven; said primary manual setting mechanism being movable in another direction from said off position for preventing said oven thermostat from controlling energization of said heating means and permitting said heat-up cool-down bimetal timer to stop the flow of electric current to said heating means at the end of a toasting cycle.

17. An electric oven toaster construction as defined in claim 12 wherein said oven toaster further comprises:

a. a primary manual setting lever for moving said primary manual setting mechanism to permit the heat-up cool-down bimetal timer to stop the flow of electric current to said heating means at the end of a toasting cycle;
 b. a latch for holding said primary setting lever in its toast position;
 c. a solenoid and a solenoid lever arranged to release said latch upon energization of said solenoid to move the primary manual setting lever to its off position; and
 d. said heat-up cool-down bimetal timer including a pair of switch contacts connected to said solenoid and arranged to supply current to said solenoid, said switch contacts being closed by said heat-up cool-down bimetal timer at the end of a cool-down cycle of said bimetal timer to energize said solenoid at the end of said cool-down cycle to thereby trip the latch and move the primary manual setting lever to the off position to open the main switch.

18. An electric oven toaster comprising:
 a. an oven chamber having a plurality of walls;
 b. electric heating means positioned in said oven chamber for supplying heat to said chamber for cooking purposes;
 c. an aperture provided in one of the walls of said oven chamber;
 d. an oven thermostat positioned outside of said oven chamber in the vicinity of said aperture, said thermostat including a control lever having an off position and a plurality of temperature setting positions for controlling energization of said heating means when said oven toaster is being used as an oven; and
 e. a primary manual setting mechanism mounted for movement to any one of a plurality of positions to control operation of said oven thermostat, said primary manual setting mechanism including a push button lever positioned below said thermostat pivotally mounted at the side of said oven toaster and extending forwardly for operation at the front of said oven toaster, the control lever of said thermostat being operatively connected to said push button lever so that said push button lever may be operated from the front of said oven toaster for controlling the temperature setting of said thermostat.

19. An electric oven toaster comprising:
 a. an oven chamber having a plurality of walls;
 b. electric heating means positioned in said oven chamber for supplying heat to said chamber for cooking purposes, said heating means including a sheathed electric resistance wire heater;
 c. a sheet metal side plate forming one of the walls of said cooking and toasting chamber, said sheet metal side plate having a generally circular aperture formed therein for receiving an end portion of said sheathed electric resistance wire heater;
 d. a thermostat including a bracket secured to said sheet metal side plate in the vicinity of the aperture for said sheathed electric resistance wire heater;
 e. an enlarged aperture formed in said sheet metal side plate in the vicinity of said circular aperture; and f. said thermostat including a bimetal having two ends, one of the ends of said bimetal being fixed to said bracket, said bimetal extending in front of said enlarged opening in order to sense the temperature within said oven.

20. An electric oven toaster comprising:
   a. an oven chamber having a plurality of walls;
   b. electric heating means positioned in said oven chamber for supplying heat to said chamber for cooking purposes;
   c. a sheet metal side plate forming one of the walls of said cooking and toasting chamber, said sheet metal side plate having an aperture formed therein;
   d. a thermostat including a bracket secured to said sheet metal side plate in the vicinity of the aperture, said bracket including a flexible portion;
   e. said thermostat including a bimetal having two ends, one of the ends of said bimetal being fixed to said bracket, said bimetal extending in front of said opening in order to sense the temperature within said oven;
   f. two switch blades separated by ceramic insulators, said ceramic insulators being fixed to the flexible portion of said bracket;
   g. a rotatable thermostat cam pivotally mounted on the flexible portion of said bracket; and
   h. manually adjustable means for adjusting the relative positions of said cam for moving said switch blades closer to or further away from said bimetal in order to set the desired temperature within said cooking chamber.

21. An oven toaster construction as defined in claim 20 wherein said control mechanism further includes:
   a. a primary manually setting lever pivotally mounted adjacent to the side plate of said oven toaster below and behind said bimetal, said lever extending forwardly in front of said toasting chamber;
   b. a push button connected to said lever for manually moving said lever about said pivotal mounting; and
   c. a link lever having tow ends, one of the ends of said link lever being pivoted to said thermostat cam and the other end of said link lever being pivoted to a central portion of said primary manual setting lever whereby upward movement of said push button causes upward movement of said primary manual setting lever and said link lever to rotate said cam to thereby adjust the relative position of said switch blades with respect to said bimetal.

22. An electric oven thermostat construction as defined in claim 20 wherein an adjusting screw is connected to said bracket, said adjusting screw extending outwardly from said bracket toward said cam and the end of said adjusting screw being in engagement with a surface of said cam for cooperating with said cam to move the switch blades toward or away from said bimetal.

23. An electric oven toaster thermostat construction as defined in claim 21 wherein said cam surface includes a rather pronounced depression, a gently curved portion which extends from one side of said depression and a steep cam surface which extends upwardly from the other side of said depression so that when said adjusting screw is on said steep cam surface the switch blades are moved so far away from the bimetal that the bimetal cannot actuate the switch blades; when said adjusting screw is in the depression of said cam surface, said switch blades are moved to their closest position respect to the bimetal and the oven is in its lowest temperature setting, and when the adjusting screw is on the gently curved cam surface the oven toaster is in one of the higher temperature settings.

24. An electric oven toaster comprising:
   a. an oven and toasting chamber having a plurality of walls;
   b. electric heating means positioned in said chamber for supplying heat to said chamber for cooking and toasting purposes;
   c. a sheet metal side plate forming one of the walls of said cooking and toasting chamber, said sheet metal side plate having an aperture formed therein;
   d. a toast timer spaced from said oven thermostat and including an actuator for permitting or preventing operation of said timer for controlling said heating means when said oven toaster is being used as a toaster, said actuator being movable to an off position for preventing operation of said timer to control a toasting cycle;
   e. a thermostat including a bracket secured to said sheet metal side plate in the vicinity of the aperture, said bracket including a flexible portion;
   f. said thermostat including a bimetal having two ends, one of the ends of said bimetal being fixed to said bracket, said bimetal extending in front of said aperture in order to sense the temperature within said oven;
   g. two switch blades separated by ceramic insulators, said ceramic insulators being fixed to the flexible portion of said bracket;
   h. a rotatable thermostat control cam pivotally mounted on the flexible portion of said bracket;
   i. manually adjustable means for adjusting the relative position of said cam for moving said switch blades closer to or further away from said bimetal in order to set the desired temperature within said coking chamber;
   j. an adjusting screw connected to said bracket, said adjusting screw extending outwardly from said bracket toward said thermostat control cam and the end of said adjusting screw being in engagement with a surface of said cam for cooperating with said cam to move the switch blades toward or away from said bimetal; and
   k. said cam surface including a rather pronounced depression, a gently curved portion which extends from one side of said depression and a steep cam surface which extends upwardly from the other side of said depression so that when said adjusting screw is on said steep cam surface the switch blades are moved so far away from the bimetal that the bimetal cannot actuate the switch blades and the oven toaster is in its toast position, when said adjusting screw is in the depression of said cam surface, said switch blades are moved to their closest position respect to the bimetal and the oven is in its lowest temperature setting, and when the adjusting screw is on the gently curved cam surface the oven toaster is in one of the higher temperature settings.

25. An electric oven toaster comprising:
a. an oven chamber;
b. electric heating means positioned in said oven chamber for supplying heat to said chamber for cooking purposes;
c. a thermostat including a bimetal for sensing the temperature within said oven chamber for controlling energization of said heating means;
d. a heat pipe connected to said bimetal; and
e. an electric resistance wire positioned around said heat pipe for conducting electric current to said resistance wire to heat said heat pipe and said bimetal to anticipate an increase in temperature within said oven.

26. An electric oven toaster comprising:
a. an oven chamber having a plurality of walls;
b. electric heating means positioned in said oven chamber for supplying heat to said chamber for cooking purposes;
c. a sheet metal side plate forming one of the walls of said cooking and toasting chamber, said sheet metal side plate having an aperture formed therein;
d. a thermostat including a bimetal positioned adjacent to said aperture for sensing the temperature within said oven chamber for controlling energization of said heating means;
e. a heat pipe connected to said bimetal; and
f. an electric resistance wire positioned around said heat pipe for conducting electric current to said resistance wire to heat said heat pipe and said bimetal to anticipate an increase in temperature within said oven.

27. An electric oven toaster comprising:
a. an oven chamber having a plurality of walls;
b. electric heating means positioned in said oven chamber for supplying heat to said chamber for cooking purposes, said heating means including a sheathed electric resistance wire heater;
c. a sheet metal side plate forming one of the walls of said cooking and toasting chamber, said sheet metal side plate having a generally circular aperture formed therein for receiving an end portion of said sheathed electric resistance wire heater;
d. a thermostat including a bracket secured to said sheet metal side plate in the vicinity of the aperture for said sheathed electric resistance wire heater;
e. an enlarged aperture formed in said sheet metal side plate in the vicinity of said circular aperture;
f. said thermostat including a bimetal having two ends, one of the ends of said bimetal being fixed to said bracket, said bimetal extending in front of said enlarged opening in order to sense the temperature within said oven;
g. a heat pipe including a piece of aluminum for conducting heat to said bimetal; and
h. means for connecting said bimetal and said aluminum heat pipe to said arm of said bracket.

28. An electric oven thermostat construction as defined in claim 27 wherein a sheet of insulating material is wrapped around said aluminum heat pipe, an electric resistance wire is wrapped around the insulating material and the electric resistance wire is connected to said sheathed electrical heater for conducting electric current to said resistance wire to heat said heat pipe and said bimetal to anticipate an increase in temperature within said oven.

29. An electric oven toaster construction comprising:
a. a cooking and toasting chamber;
b. electric heating means positioned in said oven toaster for supplying heat to said chamber for cooking and toasting purposes;
c. an oven thermostat having an off position and a plurality of on positions mounted on said oven toaster for controlling energization of said heating means when said oven toaster is being used as an oven;
d. a heat-up cool-down bimetal toaster timer including a resistance heater positioned around a bimetal for heating said bimetal; and
e. a function switch including two switch contacts and a shunt resistor positioned in a circuit to said bimetal heater for supplying a limited amount of current to said bimetal heater for heating said bimetal when the oven thermostat is moved to one of its on oven positions.

30. An electric oven toaster construction as defined in claim 29 wherein said oven toaster further comprises:
a. a primary manual setting mechanism including a lever pivoted to said oven toaster for moving said primary manual setting mechanism to an off position, a toast position, or an oven position; and
b. said primary manual setting lever being movable to open said function switch when the primary manual setting mechanism is moved to its toast position.

31. An electric oven toaster construction comprising:
a. a cooking and toasting chamber;
b. electric heating means positioned in said oven toaster for supplying heat to said chamber for cooking and toasting purposes;
c. an oven thermostat having an off position and a plurality of on positions mounted on said oven toaster for controlling energization of said heating means when said oven toaster is being used as an oven;
d. a heat-up cool-down bimetal timer including an actuator for permitting or preventing operation of said heat-up cool-down bimetal timer for controlling said heating means when said oven toaster is being used as a toaster, said actuator being movable to an off position for preventing operation of said heat-up cool-down bimetal timer to control a toasting cycle;
e. a primary manual setting mechanism mounted for movement to any one of a plurality of positions to control operation of said oven thermostat and said heat-up cool-down bimetal timer, said primary manual setting mechanism having an off position for retaining said oven toaster thermostat and said heat-up cool-down bimetal timer actuator in their off positions; said primary setting mechanism being movable in one direction from its off position to an oven position for moving said oven thermostat to any one of a plurality of positions for varying the temperature setting of said oven thermostat and to prevent the heat-up cool-down timer from controlling energization of the heating means to thereby allow the oven thermostat to control energization of the heating means for operating the oven; said primary manual setting mechanism being movable in another direction from said off position to a toast position for preventing said oven thermostat from controlling energization of said heating means and permitting said heat-up cool-down bimetal timer to stop the flow of electric current to said heating means at the end of a toasting cycle;

f. said heat-up cool-down bimetal timer including a resistance heater positioned around a bimetal for heating said bimetal; and g. a function switch and a shunt resistor positioned in a circuit to said bimetal heater for supplying a limited amount of current to said bimetal heater for heating said bimetal when the primary manual setting mechanism is moved to its oven position.

* * * * *